(12) United States Patent
Fisher et al.

(10) Patent No.: US 8,902,315 B2
(45) Date of Patent: Dec. 2, 2014

(54) HEADSET BASED TELECOMMUNICATIONS PLATFORM

(75) Inventors: Ronald Eugene Fisher, San Francisco, CA (US); Bryan Jonathan Davis, San Francisco, CA (US); Bradley Brian Bushard, Chaska, MN (US); Mark Joseph Meyer, Commerce Township, MI (US); James Fisher, Walnut Creek, CA (US); Nitin Patil, San Ramon, CA (US); Ben Young, San Francisco, CA (US); Daniel Johnson, Petaluma, CA (US)

(73) Assignee: Foundation Productions, LLC, San Francisco, CA (US)

(*) Notice: Subject to any disclaimer, the term of this patent is extended or adjusted under 35 U.S.C. 154(b) by 1207 days.

(21) Appl. No.: 12/714,693

(22) Filed: Mar. 1, 2010

(65) Prior Publication Data

US 2010/0245585 A1     Sep. 30, 2010

Related U.S. Application Data

(63) Continuation of application No. PCT/US2010/025603, filed on Feb. 26, 2010.

(60) Provisional application No. 61/208,783, filed on Feb. 27, 2009, provisional application No. 61/270,221, filed on Jul. 6, 2009.

(51) Int. Cl.
*H04N 5/33*     (2006.01)
*H04N 7/14*     (2006.01)
(Continued)

(52) U.S. Cl.
CPC .............. *H04N 7/142* (2013.01); *G06F 1/1686* (2013.01); *H04M 1/6066* (2013.01);
(Continued)

(58) Field of Classification Search
CPC ................................ H04N 7/142; H04N 7/18
USPC ......................................... 348/164, 373, 370
See application file for complete search history.

(56) References Cited

U.S. PATENT DOCUMENTS

| 5,457,751 | A | 10/1995 | Such |
|---|---|---|---|
| 5,886,735 | A | 3/1999 | Bullister |

(Continued)

FOREIGN PATENT DOCUMENTS

| CN | 2688004 Y | 3/2005 |
|---|---|---|
| DE | 19715321 | 10/1998 |

(Continued)

OTHER PUBLICATIONS

"Osiris tunable imager and spectrograph instrument status", CEPA, RevMex AA (Serie de Conferencias), vol. 16, retrieved from the Internet on Jun. 16, 2010: http://www.astroscu.unam.mx/rmaa/RMxAC..16/DF/RMxAC..16_session1/cepanew/cepa3.pdf, 2003, pp. 13-18; Science with the GTC 10-m Telescope, Grandad, Espana, Feb. 5-8, 2002.

(Continued)

*Primary Examiner* — Nhon Diep
(74) *Attorney, Agent, or Firm* — Michael A. Glenn; Perkins Coie LLP

(57) ABSTRACT

A hands-free wireless wearable GPS enabled video camera and audio-video communications headset, mobile phone and personal media player, capable of real-time two-way and multi-feed wireless voice, data and audio-video streaming, telecommunications, and teleconferencing, coordinated applications, and shared functionality between one or more wirelessly networked headsets or other paired or networked wired or wireless devices and optimized device and data management over multiple wired and wireless network connections. The headset can operate in concert with one or more wired or wireless devices as a paired accessory, as an autonomous hands-free wide area, metro or local area and personal area wireless audio-video communications and multimedia device and/or as a wearable docking station, hot spot and wireless router supporting direct connect multi-device ad-hoc virtual private networking (VPN). The headset has built-in intelligence to choose amongst available network protocols while supporting a variety of onboard, and remote operational controls including a retractable monocular viewfinder display for real time hands-free viewing of captured or received video feed and a duplex data-streaming platform supporting multi-channel communications and optimized data management within the device, within a managed or autonomous federation of devices or other peer-to-peer network configuration.

15 Claims, 36 Drawing Sheets

(51) Int. Cl.
  *G06F 1/16* (2006.01)
  *H04M 1/60* (2006.01)
  *H04N 7/18* (2006.01)
(52) U.S. Cl.
  CPC ..................................... *H04N 7/18* (2013.01)
  USPC ........................................................ 348/164

(56) References Cited

U.S. PATENT DOCUMENTS

| | | | |
|---|---|---|---|
| 6,510,325 | B1 | 1/2003 | Mack, II et al. |
| 2002/0044152 | A1 | 4/2002 | Abbott, III et al. |
| 2002/0109579 | A1 | 8/2002 | Pollard et al. |
| 2003/0156208 | A1 | 8/2003 | Obradovich |
| 2004/0215958 | A1 | 10/2004 | Ellis et al. |
| 2005/0278446 | A1 | 12/2005 | Bryant |
| 2006/0244727 | A1 | 11/2006 | Salman et al. |
| 2007/0165875 | A1 | 7/2007 | Rezvani et al. |
| 2007/0182812 | A1 | 8/2007 | Ritchey |
| 2007/0206829 | A1 | 9/2007 | Weinans et al. |
| 2007/0260797 | A1 | 11/2007 | Chen |
| 2008/0039072 | A1 | 2/2008 | Bloebaum |
| 2008/0104018 | A1 | 5/2008 | Xia |
| 2008/0133227 | A1 | 6/2008 | Kong et al. |
| 2008/0259045 | A1 | 10/2008 | Kim et al. |
| 2008/0284899 | A1 | 11/2008 | Haubmann et al. |
| 2010/0304783 | A1* | 12/2010 | Logan et al. ............... 455/552.1 |
| 2013/0044992 | A1* | 2/2013 | Boland et al. .................. 386/224 |

FOREIGN PATENT DOCUMENTS

| | | |
|---|---|---|
| DE | 10106072 | 8/2002 |
| JP | 06141308 | 5/1994 |
| JP | 2002152371 | 5/2002 |
| JP | 2002300238 | 10/2002 |
| JP | 2004206707 | 7/2004 |
| JP | 2006146542 | 6/2006 |
| JP | 2006186904 | 7/2006 |
| JP | 2006332970 | 12/2006 |
| JP | 2006352540 | 12/2006 |
| JP | 2007103091 | 4/2007 |
| JP | 2007310815 | 11/2007 |
| JP | 2008536443 | 9/2008 |
| JP | 2009021914 | 1/2009 |
| WO | WO-2006110109 | 10/2006 |

OTHER PUBLICATIONS

Srinivasan, "Blue-tooth enabled phone can act as wireless web cam", IBN Live. retrieved online on Mar. 25, 2010 from: http://ibnlive.in.com/news/bluetooth-enabled-phone-can-act-as-wireless-web-cam/45790-11.html, Jul. 28, 2007, pp. 1-3.

* cited by examiner

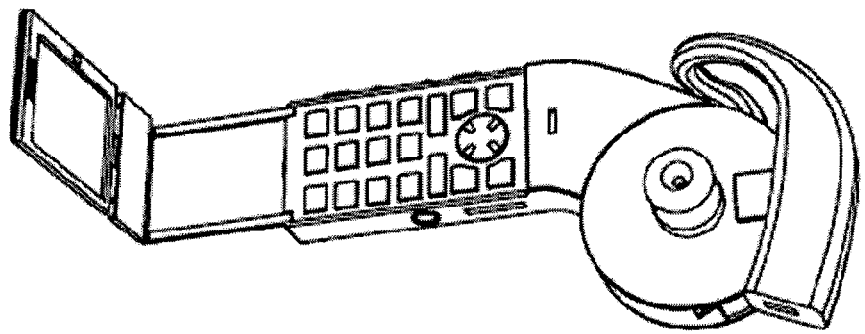
FIG. 11B
FIG. 12  Hands-free, wireless & automated systems controls
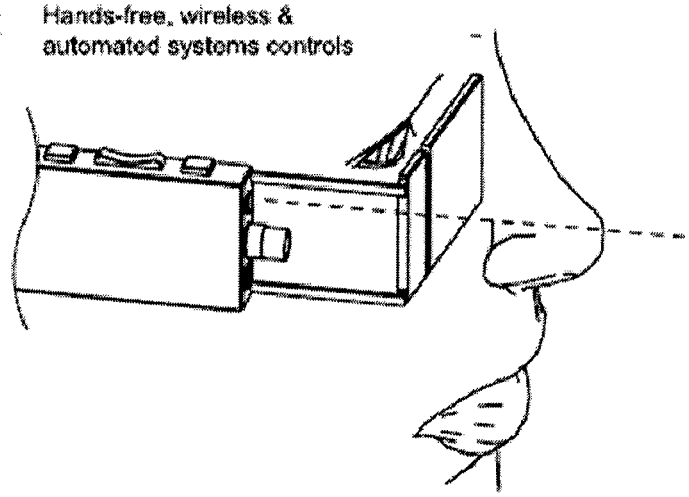

FIG. 13  Hands-free, wireless & automated systems controls
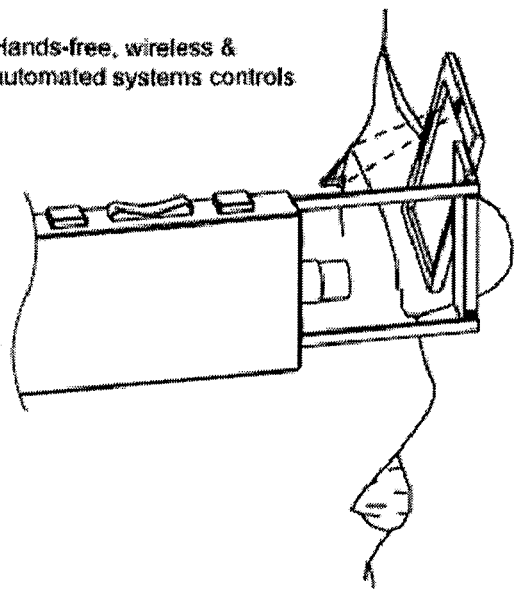
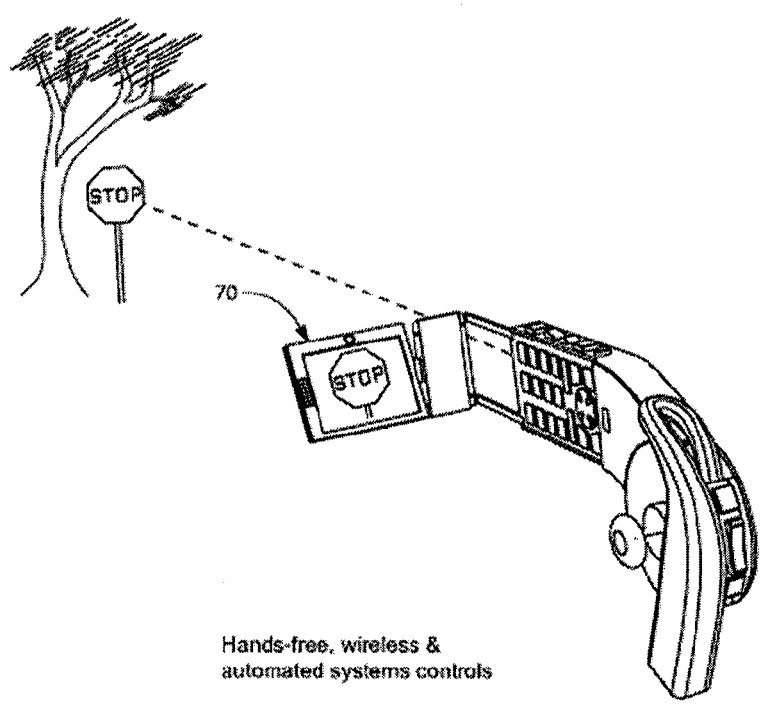
Hands-free, wireless & automated systems controls
FIG. 14

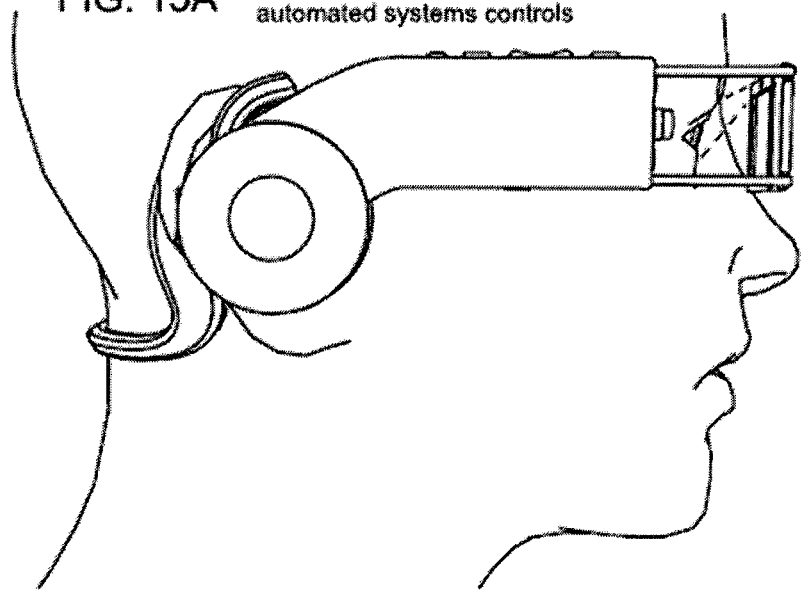
FIG. 15A  Hands-free, wireless & automated systems controls
FIG. 15B
 
98a
98b
98c
98d
98e Hands-free, wireless & automated systems controls

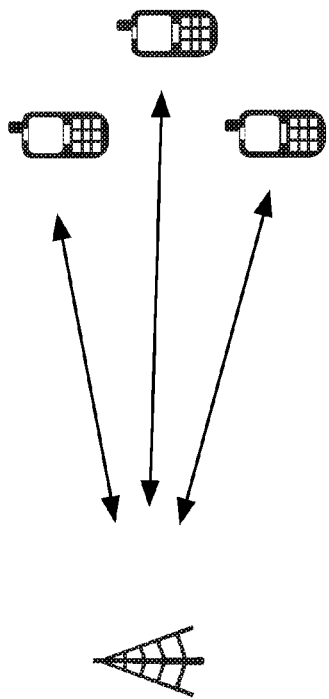
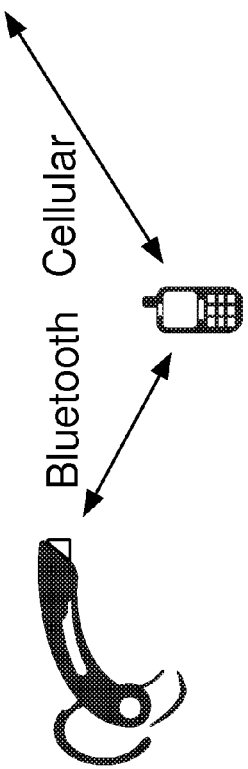
Figure 37
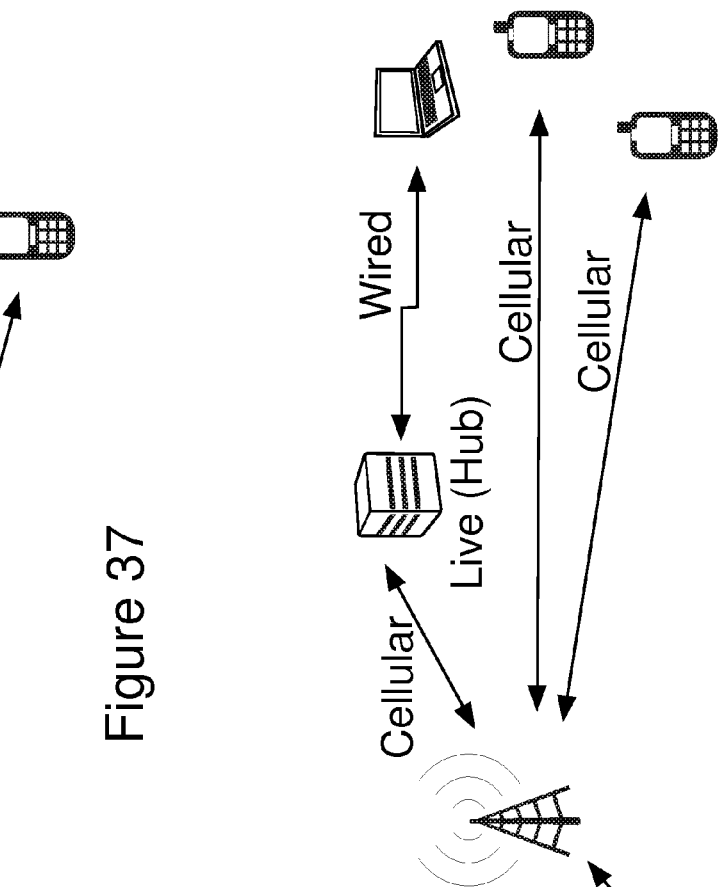
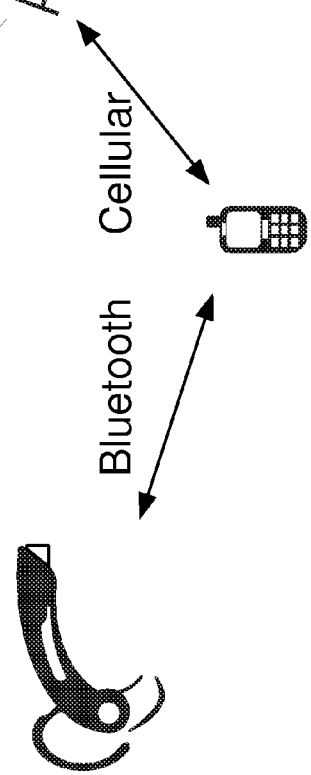
Figure 38

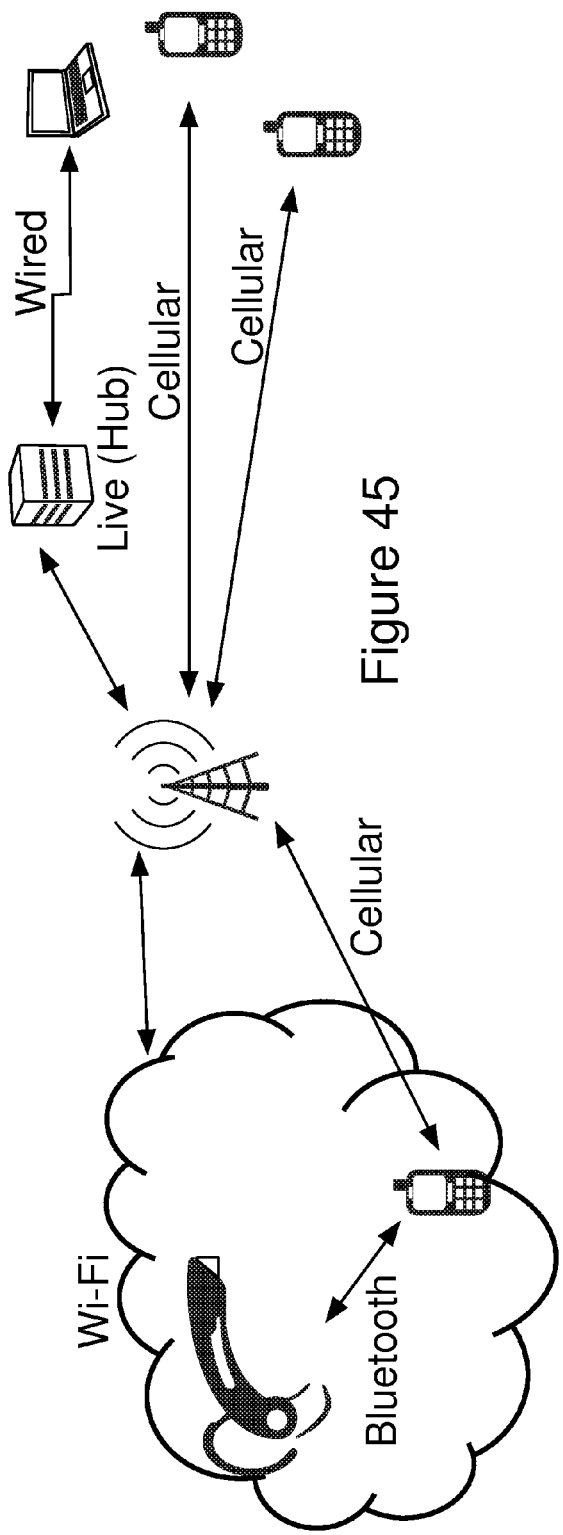
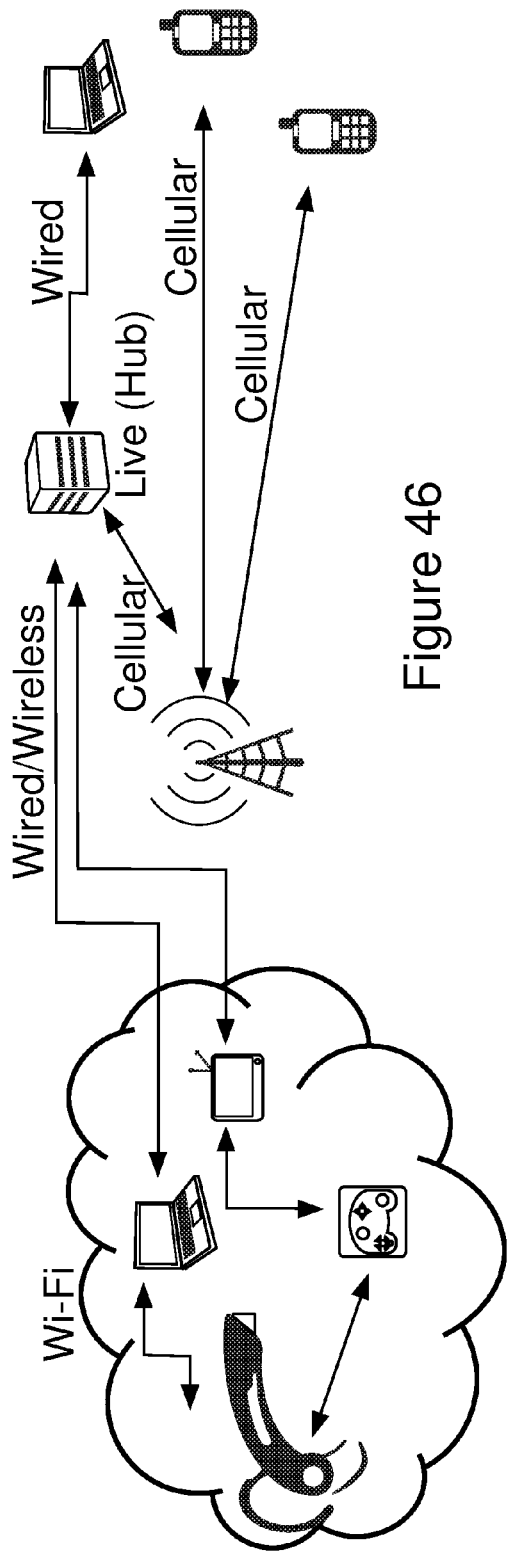

HEADSET BASED TELECOMMUNICATIONS PLATFORM

CROSS REFERENCE TO RELATED APPLICATIONS

This application is a Continuation of PCT Patent Application No. PCT/US10/25603, filed 26 Feb. 2010, and claims priority to U.S. Provisional Patent Application Ser. No. 61/208,783, filed 27 Feb. 2009 and U.S. Provisional Patent Application Ser. No. 61/270,221 filed 6 Jul. 2009, which are incorporated herein in its entirety by this reference thereto.

BACKGROUND OF THE INVENTION

Technical Field

The invention relates to voice, data and audio-video streaming to and from a hands-free wireless mobile device. Further, the invention relates to multiple embodiments of a video camera telecommunications headset with a retractable viewfinder/monocular display and a laser rangefinder offered as either a single unit hands-free wireless real-time bi-directional and multi-feed telecommunications headset or as a modular Bluetooth earpiece headphone (Headphone) unit with a detachable handheld cellular video camera unit, with the earpiece unit serving as either a stand-alone wireless Bluetooth Headphone and personal media player or as a wearable multimedia port for the detachable handheld cellular video camera telephone unit that when linked together operate as a single autonomous hands-free wireless video communications headset capable of still image and audio-video capturing, recording and streaming to and from a receiver or group of receivers and real-time viewing and control of captured and/or received audio-video feeds via the retractable monocular viewfinder or other paired multimedia display system.

Further, the invention relates to the headset accessories including an adjustable docking station for recharging and/or use of the headset, as a stationary wired or wireless IP camera, removable/rechargeable earpiece and neckpiece battery units for continuous hands-free wireless mobile headset, headphone and/or other ported device operations and a pair of multimedia sunglasses for active binocular display and eye to camera automation of the headsets optical and digital zoom, day and near infrared night vision camera.

Further the invention relates to device control software that is embedded into the headset and/or downloaded to the headset (or other networked device) and/or executed remotely from an external server. The device control software provides a system and method for infrastructure and ad-hoc networking, operational behavior management, communications protocol selection, security, data and power characteristics, modular data broadcasting, hands-free and remote systems control and autonomous, paired and/or networked device optimization,

DESCRIPTION OF THE BACKGROUND ART

Field of Invention

When wireless/cellular phone technology was initially commercialized, cellular phones were voice-only communication devices, i.e. such devices did not have any capability beyond voice communication. These cellular phones were hand-held devices. A hands-free option was introduced that required plugging in a wired headphone connection between the phone and an earpiece and microphone. Over time, some new technologies evolved.

Most notably:
Bluetooth Communication Protocol for short-range wireless communications enabling wireless devices to communicate with each other over short distances. With the introduction of the Bluetooth communication protocol, the wireless phones could communicate with other devices over a short range. This advancement in technology created a new market for wireless accessories. The very nature of the protocol eliminated the need for a wired device to establish hands-free operation. Now, the user could use a cellular phone to communicate with an accessory (or any other device) over a wireless network, thus truly making the use of the device hands-free.

Digital Video Camera and Streaming: With the advent of digital imaging cameras could capture and store images and videos in a digital format. The next step in the evolution of the video cameras was their ability to stream the video over wireless networks. Modern day cameras also have built-in GPS capabilities.

Wearable cameras such as helmet cams began as bulky still image and video cameras that were often bolted into athletes' helmets. With the onset of digital video recording and flash memory came a new generation of what has been referred to as lipstick or bullet cameras that were smaller and lighter and were either wired to an external digital recorder or incorporated some embedded or removable flash memory storage. The next generation of wearable cameras introduced wireless data transmission such as Bluetooth for wireless uploading of stored still image and video files and/or Wireless IP Cameras that offer outgoing video streaming to the Internet via a Wireless Local Area Network or wired or wireless video streaming and networking via an external digital recorder or intelligent paired computing and wide or local area networking device such as a smart phone or personal computer.

The hands-free wireless video camera telecommunications headset represents a new generation of entirely autonomous wearable two-way and multi-feed hands-free wireless communications devices capable of sending and receiving voice data, and audio-video without the need for a paired external, handheld, wired or wireless computing, networking or storage device.

DESCRIPTION OF THE PRIOR ART

Comparatively US patent 20100039493, Mobile video headset Feb. 18, 2010, comprises an embodiment that allows hands-free imaging of the users surroundings via a camera and transference of simplex (one-way) audio and video stream to a personal (nearby) electronic device. The evolution in this invention advances all communications, including the audio video stream, to be duplex with a plurality of devices for full multimedia exchange amongst multiple devices. Paired or connected devices do not have to be on the person or nearby, instead they can be anywhere a network connection can be established. Additionally, other unified communication data (email, text message, voice, GPS) is integral to the device for a rich communication platform amongst a group of connected devices. Also, user control capabilities (hands-free) are advanced by voice command, eye tracking, motion gesture, and hand operated controls.

Other patents utilize off-board computing power to process data and coordinate control of a wearable (headset) device, this invention integrates all functionality within the headset enclosure.

Technology referenced in some of the prior art (referenced patents) should be considered experimental and largely remains in the laboratory or is prohibitively expensive. Conversely, much of the technology in this invention is proven and available as commercial-off-the-shelf solutions ready for integration into a design.

Multiple prior art references incorporate large and heavy headset apparatus. This invention is less intrusive to the user's movement and other worn clothing or accessories. The target weight of this headset is less than 100 grams.

SUMMARY OF THE INVENTION

The battery powered video camera telecommunications headset is the next innovative step in video capture and wearable hands-free wireless communications devices. Designed to capture, record, stream and display what the eyes see and what the ears hear, the Headset offers two-way and multi-feed real-time voice, data and audio-video communications and streaming to and from multiple wireless network connections, or locally to persistent storage. Operating as an autonomous, paired or peer-to-peer networked computing and multimedia device the Headset offers a wide range of hands-free device operational controls and interfaces including voice command, automated eye-motion and facial recognition for eye-camera control, light and motion sensor for the embedded day and night vision camera, and laser rangefinder automated optical and digital zoom, remote paired or networked device and camera control, and redundant embedded and removable/rechargeable and rapidly swappable battery power sources for uninterrupted hands-free wireless device operation.

The headset can operate as a paired accessory to a cell phone, PC, TV, video game console or other external wired or wireless Bluetooth, Wi-Fi or WiMax, Cellular, or other wired or wirelessly networked device. The video camera telecommunications Headset is worn on the ear similar to other wireless Bluetooth and/or Wi-Fi earpiece Headsets yet unlike its predecessors the Headset is more than a Bluetooth accessory; it is a hands-free wireless GPS enabled Wide, Metro or Local and Personal Area Network cellular communications system capable of wholly autonomous operations. Incorporating an embedded optical and digital zoom video and still image camera with both day and infrared night vision capabilities and a retractable monocular viewfinder display, the headset is an intelligent hands-free wireless device capable of simultaneously capturing, recording, streaming, receiving and outputting voice, data and audio-video in real-time and over multiple networks and pairing with one or more networked devices to create an ad-hoc virtual private network over any WAN, MAN, LAN, PAN or a combination of a paired, managed network, federation of autonomous networked devices or other peer-to-peer networking configuration.

Until now Bluetooth headsets, wearable video cameras and other hands-free wireless devices have been limited in their capability due to one of five major constraints; power, wireless range, size, weight and data processing capability. In addition to introducing functional hardware solutions to each of these physical constraints the Headset also incorporates a mobile device control system that introduces a system and a method for modular device, group and network data, protocol and power management and optimization, modular data channeling, broadcasting and communications, coordinated and shared operations, security and remote systems control.

The Gateway Operating System (GOS) Control Software is designed to support numerous embodiments of the telecommunications headset and other unified, paired and networked communication devices (Headset in this invention, wireless Internet devices and stationary/wired Internet devices) and introduces a modular device architecture and management system, a model for wired and wireless device networking, paired, autonomous, hierarchical or other managed device groups, peer to peer and Virtual Private Networking (VPN) while constantly optimizing single or multiple networked device configurations for data, power and network optimization shared and/or unified operations and inter-device and multi-device secure ad-hoc networking over any combination or type of wired and/or wireless network, public or private federation of autonomous wired or wireless devices.

The GOS is a modular device, data and network management platform and operations model is designed to allow for components or whole devices to be attached or detached and systems to be turned on, shut off, monitored and constantly optimized specific to the available power, memory, wireless transmit power, and network bandwidth of all available networked devices and/or other user, group, network, event, location and/or application based device preferences. The GOS algorithms are consistently generating and updating optimized device operations based on automated and/or user specified guidelines and priorities for each of its coupled systems and/or modules.

The GOS is designed to expand to include one or many devices in a synchronized ad-hoc or coordinated, hierarchical, managed or other device network organizational model offering a standard modular device and data management system. It is also a model for individual and group device power and data management and storage, protocol selection, transmission, broadcasting, networking, applications and systems coordination over any number of wired and wireless networks for optimized individual and grouped device operations and remote systems control.

In addition to supporting multi-device coordinated networking the GOS organizes systems through standardized APIs for interaction of system processes, organized data and communication protocol types and applications such as device, user and network identification and security, location and contextual data, voice, audio and video, communications protocols, system controls, data management, and power management. The GOS identifies, quantifies, and prioritizes local and remote networked device operation, networks and applications for each of its designated system modules based on a set of variables such as power use, data processing speed, network strength, bandwidth, available data and memory storage.

For example a "Location and Contextual Data Module" may be designated to acquire all data and manage all tasks and processes specific to the location of the device and/or its relation to another device, address, position, location, time/date, contextual event or coordinated application and/or the source and location of any incoming or outgoing data stream. All location and contextual data acquisition, processing and transmission are managed by the location and contextual data module. The data module will automatically locate, organize and prioritize all available firmware components and or software processes designated for the acquisition, processing and or application of location and contextual data. The Location and Contextual Data Module in each independent or networked device will independently quantify and prioritize all of its local firmware components and related software processing systems and location and contextual data applications based on a universal set of variables.

Each Headset or other networked device or group of networked devices may have more than one method, system and/or set of firmware components capable of acquiring and utilizing the same or similar data. Each module then prioritizes all local or networked firmware component's for each of its designated tasks and related data sets in order to select the optimum system(s) and method for acquiring a specific data set and accomplish each task and/or process and which tasks should be acquired and/or processed and/or designated to each available system and/or networked device.

Each individual device then coordinates all networked and independent functions for each module and selects which local tasks, processes, components and/or networks should be idled or shut down at any given moment based on the independent and group generated modular algorithm for optimized system operations. Each device, device group and/or network can be pre-defined with user preferences and updated for coordinated device system settings. Each Module responds based on networked group defined standards for measuring the data, power and networking efficiency and application for all designated processes, tasks, data sets and all available firmware and software systems specific to each task. All data, system, component, device and network operations are then synchronized, coordinated and managed on a modular systems level for one or a group of networked devices with each module continuously updating its operation specific to system capabilities, optimized use case scenario and user priority settings for all available components and networked devices. Each module is assigned its own data channel on which all module specific data streams are transmitted upon. Modular channels and related data streams can be encrypted and grouped together with other channel data streams and sent out via a single network port.

The Headset and GOS Control Software offers a modular device, data and network management, operations and network optimization model that can be installed as an embedded system downloaded and customized to an existing operating system as a middleware application and/or networked to a device either via a networked hub or via a peer-to-peer ad-hoc networked or managed network configuration. The software is configurable for all headset and other networked device embodiments and applications including but not limited to wearable, hands-free and remote wireless systems controls.

A mash-up of a GPS enabled video camera and camcorder, IP camera, video VoIP phone (IP Telephony), Personal Media Player and mobile handset (cell phone) and a hands-free wireless earpiece Bluetooth Headset. As a cell phone the headset is a mobile, wide area networked device that offers one-to-one and one-to-many communication, file storage, audio, text, picture and video communication. As an IP camera phone, the headset provides real-time voice, data and audio-video over a Metro or Local Area, wired or Cloud wireless or wired Internet link and can serve as a wireless router and hot spot for an ad-hoc off-network peer to peer group of devices or secure Virtual Private Network (VPN). As a personal media player the headset offers an entirely autonomous hands-free wireless solution.

The Headset is designed as a modular device on both a physical, functional, and embedded system design architecture. Allowing for components to be attached or detached specific to the desired application. A first embodiment comprises a one-piece GPS enabled hands-free wireless wearable audio-video camera headset capable of two-way, multi-feed and duplex networked voice, data and audio-video communications offered in a curved or rectangular video camera phone (CP) Headset unit body design while a second embodiment introduces two-piece detachable handheld cellular CP unit and a Bluetooth earpiece Headphone unit with both units capable of operating autonomously or, when attached as a single hands-free wireless telecommunications headset device with the earpiece Headphone Unit serving as a universal port for the handheld CP unit.

The headset supports a redundant data and power management and storage system designed to offer both embedded removable/rechargeable and rapidly swappable data and power storage options while offering a modular data management system capable of supporting entirely standalone autonomous device operations, communications, automated and user control and/or securely transfer voice, data and/or video interface control to an authorized external wired or wirelessly networked device or group of devices. Additionally an embedded laser sight and range finder support automated zoom functions and hands free control of the optical and digital zoom camera with light and motion sensor and accelerometer to retractable monocular, view finder, data management and/or headset systems control partially or entirely to an authorized remote wired or wirelessly networked device or group of devices.

The cellular CP module and earpiece Headphone module which are introduced in both single one-piece embodiments and detachable two-piece embodiments, both include independent battery and power systems, independent flash with the CP Unit housing a removable/rechargeable battery and the Headphone unit housing an embedded rechargeable battery. The earpiece Headphone unit also has a dual data/power accessory port system for a removable/rechargeable earpiece or neckpiece battery unit both serving as a counter balance and support system for the headset and/or Headphone units.

In both the single unit and two-piece autonomous CP and Headphone embodiments the system automatically selects from one or more of the available batteries based on power charge status, application and run time scenarios with the CP unit handling the primary processing, system and network drivers and the earpiece Headphone unit housing a microprocessor for the earpiece microphone, speaker, media player and user controls, Bluetooth and multimedia device port and connector functions. Both the CP and Headphone units have independent embedded and removable flash memory ports and independent data storage and management functionality allowing both the CP unit and earpiece unit to operate jointly or independently in both the single unit and two-piece unit embodiments.

When the CP and Headphone unit are attached either by default in the single unit embodiment or by attachment in the two-piece embodiment the system may revert to the larger CP Unit Battery and only use the Headphone battery as a backup or the entire headset may revert to the external earpiece battery unit for all high-level applications and the CP unit battery for all core communications functions so that should the earpiece battery be removed the headset will continue to function without interruption. The modular headset system is able to calculate and use all available resources and make operational decisions based on optimum and redundant functionality.

By introducing the external removable/replaceable tether-free battery power storage option the Headset is able to optimize space and manage heat, weight, size and device operations more effectively and by offering redundant power, storage and system functionality the Headset becomes a truly hands-free wireless communications device and tool with the capability of uninterrupted use by simply replacing the external earpiece or neckpiece battery unit with a fully charged back up unit or directly plugging the earpiece or neckpiece battery unit into an external battery pack or other networked or battery powered device.

Because of the size and weight constraints that are lifted by utilizing the removable earpiece and neckpiece battery solution the CP unit is more comfortably able to house a full optical and digital zoom camera with light and motion sensor, day and night vision lens system, laser rangefinder for target location, motion sensor and automated camera zoom as well as retractable monocular, view finder for real time display of captured or incoming audio-video feed, eye motion sensor for eye-camera control, eye retina scan security, a dual camera and voice microphone system for noise cancellation, voice recognition and voice command and a multi-channel, duplex networking communications module for multi-device, telecommunications, teleconferencing, telenetworking, coordination, and remote systems control.

An expandable platform is possible with the adaptable CP module which is offered in both a curved and a rectangular body design with either a Multimedia and power connector port or retractable high-speed USB port option. The CP module can be operated as either a handheld GPS, Cellular, Wi-Fi or WiMax and Bluetooth duplex and multi-channel cellular, IP and peer to peer networked mobile phone and camera/camcorder device or when ported with the Bluetooth earpiece Headphone module as a hands-free wireless audio-video camera and two-way and multi-feed telecommunications headset. The main processing component is in the CP module which contains an optical and digital zoom day and near infrared night vision camera with an expansion connector for interfacing to other peripheral components, a retractable display/monocular eyepiece view finder with eye and facial scanning system for real-time hands-free viewing of day or night vision camera video feed, a laser sight and rangefinder for visual camera targeting and automated optical and digital zoom, dual front camera and voice microphones for isolated audio-video and audio-voice feeds for noise cancellation and speaker for use as a handheld phone or for audio-video playback, and a hot swappable battery, and SD storage slot a complete numerical key pad and an independent camera/rangefinder audio and video control button array.

The Bluetooth earpiece Headphone wearable plug and play module serves as a universal port with both a multimedia and power port and a high-speed USB port for multi-device synced networking and operations and dual data/power earpiece/neckpiece removable battery ports on either end of the Headphone allowing the Headphone to be reversible and worn on either ear by supporting an external earpiece battery clip or adjustable neckpiece headset battery clip that can be inserted into either end of the earpiece Headphone for support, counterbalance and external, rechargeable and swappable power source for uninterrupted use and a second SD storage slot for use as additional backup memory for the CP module when ported or for use in audio file storage and play back when the earpiece Headphone is worn as one or a set of Bluetooth earpiece Headphones for use as either a hands-free Bluetooth communicator or as a standalone wireless Bluetooth personal media player capable of entirely autonomous operations (free of a connection to an external networked or media storage device or as a unified extension of the CP module via the multimedia or USB port, or as a paired wired network accessory or wirelessly via a Bluetooth paired connection or a Wi-Fi peer to peer networked connection (when connected with the CP module or other Wi-Fi enabled device).

Rechargeable/Replaceable External Earpiece Battery Units

The replaceable/rechargeable external earpiece battery units and the adjustable neck earpiece connector are designed to wrap around the ear to provide added weight balance and support as well as extended battery life for the Bluetooth Headphone particularly when joined with the wearable CP unit.

The removable earpiece battery port in the Bluetooth earpiece is designed for rapid replacement so that the replaceable/rechargeable earpiece battery units can be replaced with a back up earpiece battery without disconnecting the camcorder telephone unit from the earpiece unit or without taking all or part of the headset off of the ear thereby supporting uninterrupted use. The removable/replaceable earpiece battery unit has a micro-USB port designed for recharging the earpiece battery, headset battery and camcorder telephone batteries while in use. The micro USB port in the earpiece replaceable/rechargeable battery may also be used to sponsor a direct wired pairing and data transfer between the video camera headset and an external telephone or other multimedia, computing, data storage, video gaming, networking, broadcasting and/or communications device. Multi-channel Wearable Camcorder/telephone Unit The camcorder telephone can be operated as a normal handheld phone wirelessly connecting with the earpiece one or both of the Bluetooth earpieces as a paired device or connected and joined directly with one of the earpieces via the 30 Pin Connector or USB 3.0 port becoming a single hands-free wireless video camera headset and audio-video communications system.

The universal Bluetooth earpiece units are designed to support and connect with multiple styles and types of hands-free video camera/phone units and designs. Three preferred video camera and video communications headset embodiments include:

A curved camcorder/telephone unit with a retractable high speed USB port designed to connect into the Bluetooth earpiece and operate as a single hands-free wireless video camera, and WAN, LAN or PAN duplex and multi-feed voice, data and audio-video communications headset.

The curved unit with a face form fitting design and a forward facing video camera designed to capture video at the eye level.

Embedded and rapid removable/replaceable battery options for uninterrupted use.

Embedded and removable data storage for voice, data, still image and audio-video recording and Day and infrared night vision video camera with optical and digital zoom The video camera is preferably capable of duplex audio/video streaming; detecting of daylight, lowlight, and night light conditions; video streaming and still photography in varying light conditions; responding to control commands received via the headset; and stabilizing the image as the headset wearer moves.

Embodiments of the invention also provide for the control of the behavior of the headset. An embodiment of the headset has software that controls the operational behavior of the headset by responding to the external stimuli or commands; communicates with the external devices over wireless networks such as Bluetooth, cellular, or Wi-Fi; manages the modes of operation of the headset, which modes can comprise any of (a) voice-only, e.g. voice of the headset-wearer, (b) video-only-with-sound, e.g. video streaming as seen through the onboard video camera and sound of the video stream, but no voice of the headset wearer, (c) video-only-without-sound, similar to (b) but without sound in the video stream), and (d) video with voice; responds to (a) onboard manual controls that are operated by the headset wearer, (b) voice commands, and (c) instructions received from remote control devices, such as but not limited to a PC or another wireless device; and is capable of video transmission for (a) storing to another device, (b) uploading to the Internet, and (c) real-time duplex audio/video communications via a cellular, wireless, direct, or LAN connected device.

One form of operational control of the headset comprises of the following steps and sequence:
  Identification of the headset to be controlled ("controlee");
  Electronic handshake between the controller and controlee;
  Identification and selection of communication options between the controller and controlee;
  Execution of the control action by the control software in the headset; and
  Respond back to the controller.

Although in the above depiction there is a notion of a controller and a controlee, in reality the headset and its participating devices are peers in the system. The headset or any of the other devices can assume the role of controller. The control software in the headset includes an algorithm the electronically negotiates the role of the device, i.e. controller or controlee, with the participating device based on that device's capabilities.

Having described the sequence of steps for operational control, control actions available in one embodiment are grouped in the following high-level categories:
  Headset (device itself) controls;
  Video camera and Laser Rangefinder controls;
  Cell Phone & View Finder controls;
  Earpiece & Media Player Controls:
  Audio system controls;
  Eye and Facial Recognition and automated camera zoom controls
  Device Authorization & Security controls
  Communications & Network controls;
  Power controls;
  Recording controls; and
  Storage controls.

Further, an embodiment of the invention provides for communication amongst the headset, a hand-held device (typically a cellular phone), and external entities. The available communication protocols include, for example, Bluetooth, Wi-Fi, and cellular. Protocol selection is made, for example, based upon such factors as optimum power consumption, desired audio or video quality, available bit-rate, and the type of data transmitted.

BRIEF DESCRIPTION OF THE DRAWINGS

FIG. 11B is a perspective view depicting the curved CP module, connected to the Headphone earpiece module, with monocular display extended.

FIG. 12 is a perspective view showing a user wearing the headset with the monocular viewfinder extended over the eye and depicting the laser range finder optical camera zoom and motion sensor hand gesture command systems.

FIG. 13 is a perspective view showing a user wearing the headset with the monocular viewfinder extended over the eye and depicting the eye scanner and eye and facial motion tracking system for eye-camera control.

FIG. 14 is a perspective view depicting the monocular viewfinder displaying the viewed field of the camera while using the range finder for automated camera zoom control.

FIG. 15A is a perspective view showing the headset worn on the ear with the monocular viewfinder and the eye scanner extended in front of the eye while depicting the eye and facial motion tracking system for eye-camera control.

FIG. 15B depicts five examples of eye positions and facial attributes that may be recognized by the headset for automated optical and/or digital zoom, wide angle view and other camera modes and controls.

FIG. 37 is a schematic diagram showing communication between the headset with paired device and other mobile devices using cellular and Bluetooth protocols according to the invention;

FIG. 38 is a schematic diagram showing communication amongst the headset, the live hub, and client devices, such as mobile phones and computers using cellular connections, as well as direct Internet connections, according to the invention;

FIG. 45 is a schematic diagram showing communication between a headset paired with mobile devices inside a Wi-Fi network and the external devices over the cellular network, where the communication between the live hub and the client devices is over a cellular network and a direct Internet TCP/IP network according to the invention; and FIG. 46 is a schematic diagram showing the headset, a computer, and other devices in a Wi-Fi network, where the headset is paired via one or more Bluetooth connections or a Wi-Fi peer-to-peer ad-hoc group device network with a game controller and a Television or computer monitor and a personal computer (PC) that connects the headset and paired and/or networked devices to a live Internet hub directly over a wired Internet connection, and where the communication between the live hub and remote client devices occurs over a direct wired Internet TCP/IP or wireless Internet cellular networked connection according to the invention.

DETAILED DESCRIPTION OF THE INVENTION

Embodiments of the invention relate to a hands-free wireless video camera telephone headset, which comprises a real-time two-way and multi-feed voice, data, and audio-video communications device that can operate as a standalone, long range cellular communications terminal and/or as a short-range, paired wireless accessory to a mobile phone, PC, TV, video game console, other wireless device or to a wired Internet terminal.

Embodiment of the invention also provide a manual and/or automated communications protocol selection for device power optimization, paired and/or independent wireless voice, data, and audio-video communications, streaming, networking, recording, archiving, storage, device and caller authorization and security, remote wireless video camera and device control, and remote viewfinder via any mobile phone, cellular, Bluetooth, and/or Wi-Fi enabled terminal.

Figure 1A:
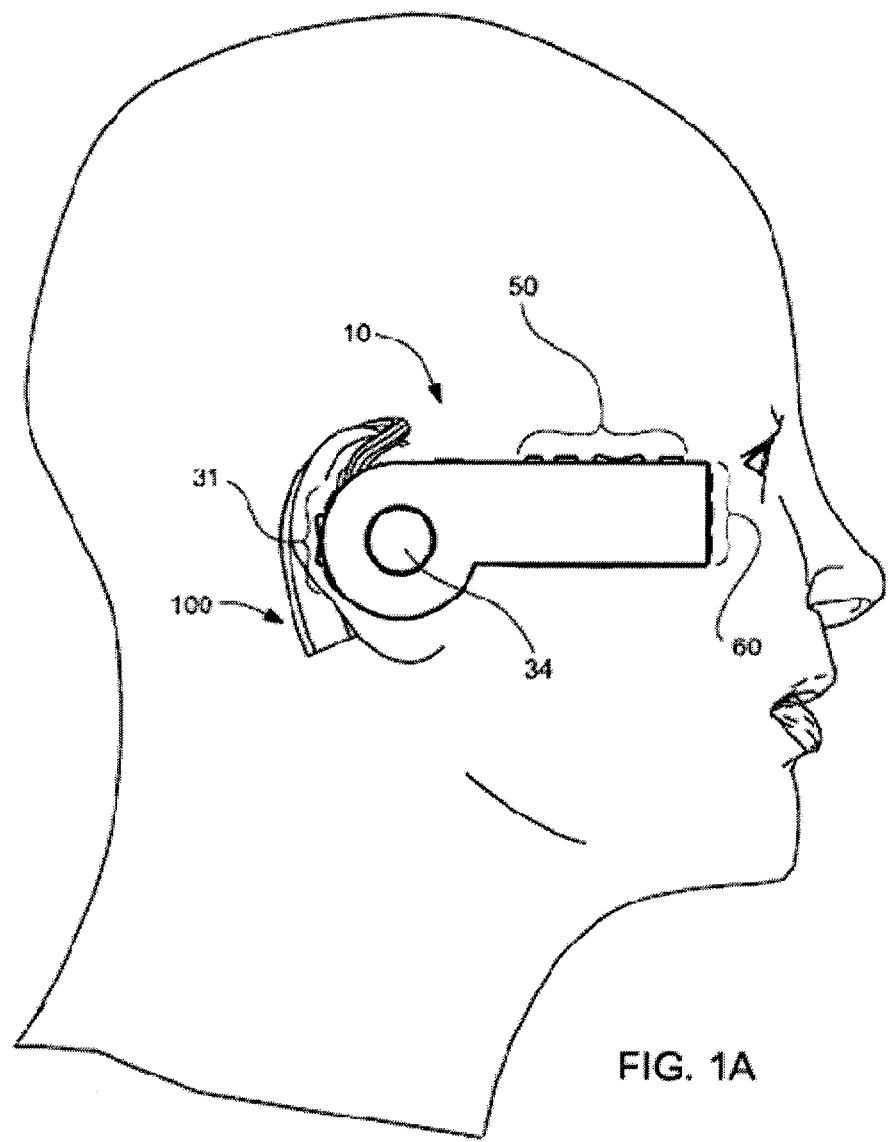
FIG. 1A is a perspective view depicting a single body earpiece and video camera telephone headset (Headset) with a rectangular camera phone (CP) unit design worn on the ear with the headset counterbalanced and held onto the ear by the removable/rechargeable earpiece battery unit.

FIG. 1A is a perspective depiction of a user wearing the one-piece rectangular headset 10 apparatus. Earpiece 30 controls 31 and 34 function as user interface controls for the earpiece and mode adaptive camera phone controls. Supplemental Headphone power is supplied by the earpiece battery 100. Camera phone control 50 functions as user controls for camera and phone operations. Camera sensors 60 function as audio, light input and output for the camera phone module.

Figure 1B:
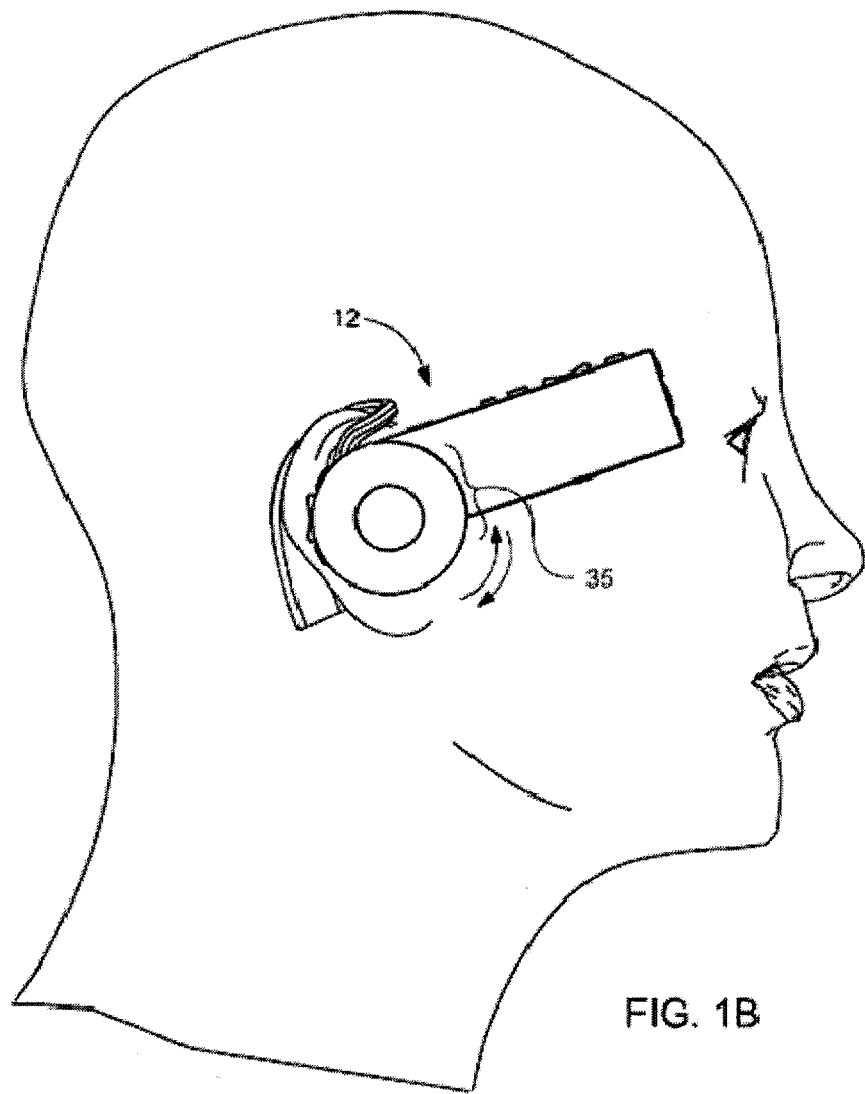
FIG. 1B is a perspective view depicting an adjustable embodiment of the single body Headset with a rectangular CP unit design with a sliding track to adjust the direction the headset camera is facing.

FIG. 1B is a perspective depiction of a user wearing the modular rectangular headset 12 in an angular position by adjustment of the movable track 35.

Figure 2A:
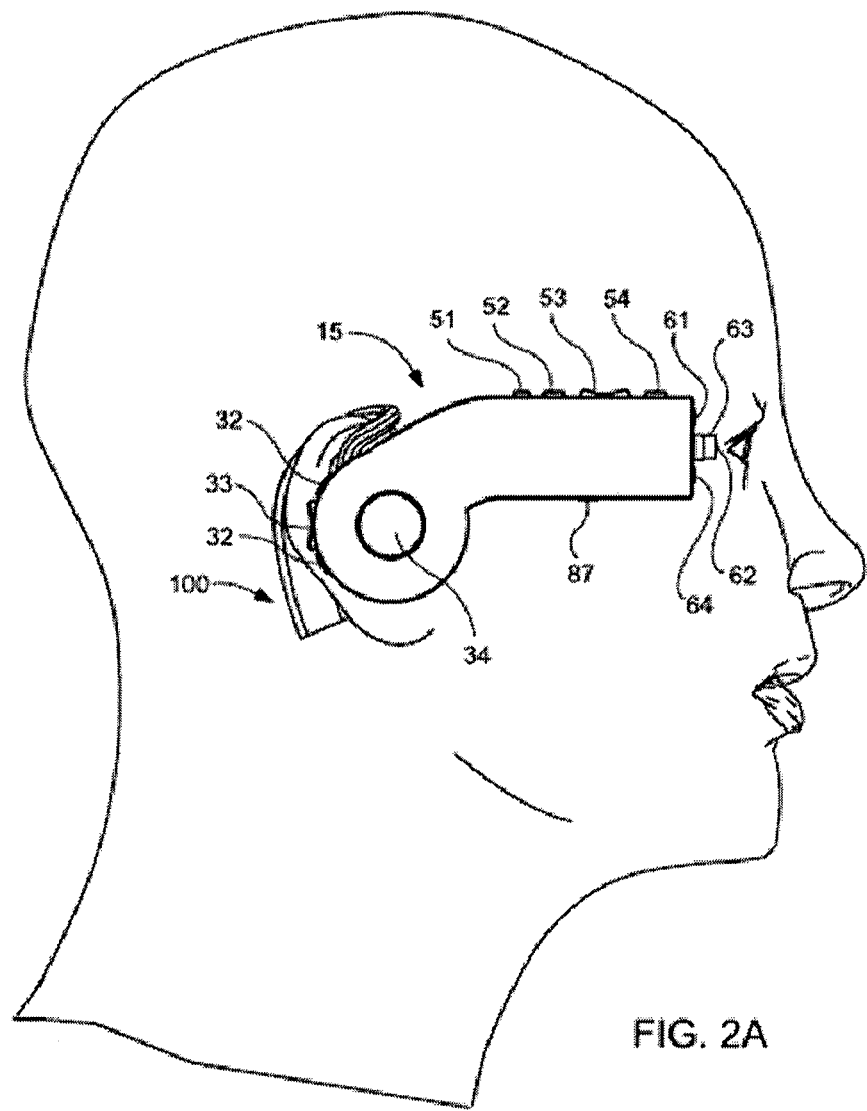
FIG. 2A is a perspective side view depicting the single body curved CP unit, worn on the ear with the removable/rechargeable earpiece battery unit illustrating the headset and Headphone button arrays and forward facing sensors.
Figure 2B:
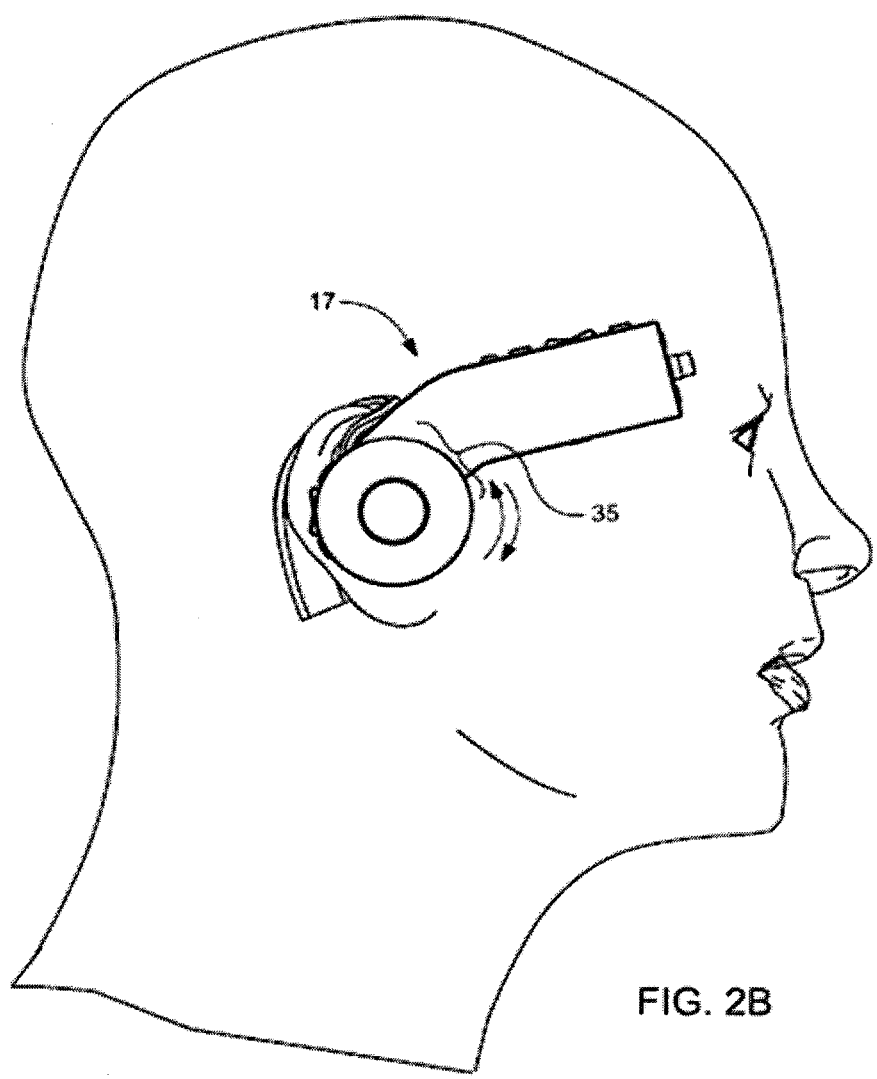
FIG. 2B is a perspective view depicting an adjustable embodiment of the single body Headset with a curved CP unit and a sliding track to adjust the direction the CP unit camera is facing.

FIG. 2A is a perspective depiction of a user wearing the curved headset 15 apparatus with the user controls and ports identified.

Figure 3:
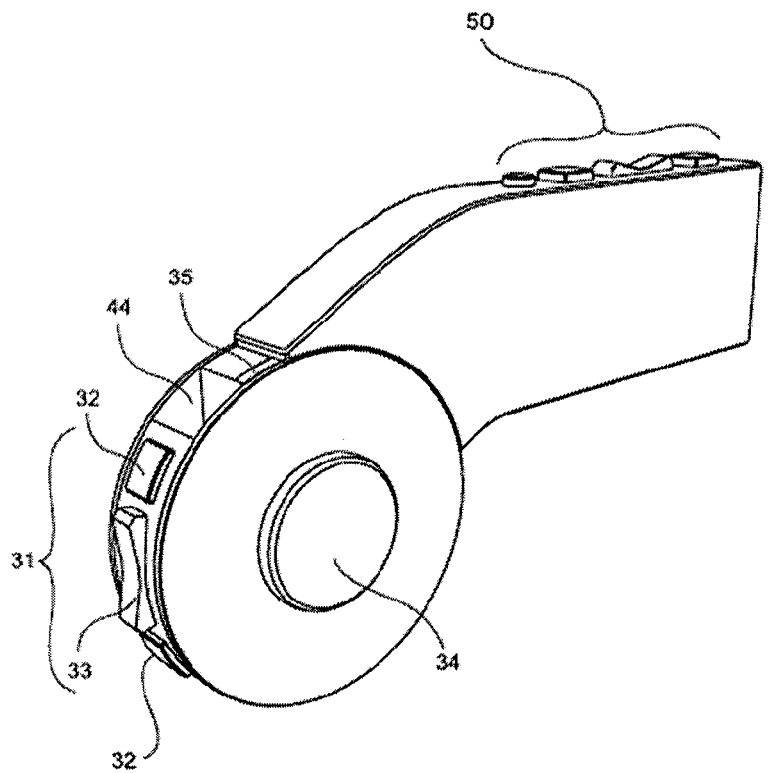
FIG. 3 is a perspective view of the single body curved headset embodiment depicting the Headphone button array, sliding track and power port for the external removable/rechargeable battery units.

FIG. 3 is a perspective depiction of the modular curved headset 15 apparatus with the user controls 50 identified. This embodiment is modular in that it can be configured to operate with a plurality of accessories attached to the earpiece hub along with the ability to detach the camera phone module to be used as a handset phone. The earpiece user controls 31 activate Menu/Select or Play/Pause Button 32, Toggle Button Volume/Audio Track 33, Call Start/End Button 34. An adjustable angular track 35 allows adjustment of the camera phone FOV aim off of the head. The accessory port 44 interfaces to power and audio output peripherals.

Figure 4:
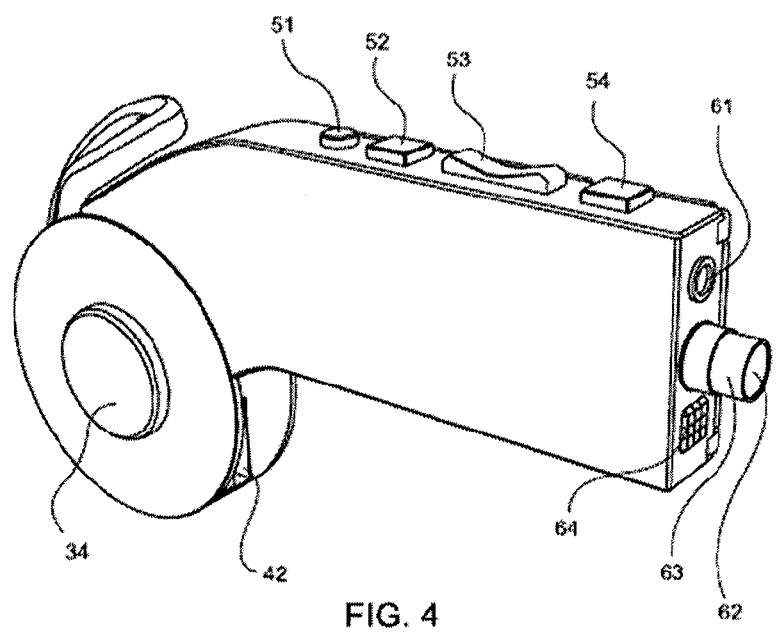
FIG. 4 is a perspective view of the single body curved headset embodiment depicting the headset user controls and forward facing sensors including the laser rangefinder, extended optical zoom camera lens, camera microphone and earpiece Headphone high speed USB port.

FIG. 4 shows camera phone controls for Call Start/End Button 34, Menu/Record Button 51, Select/Play/Pause Button 52, Toggle Button for Volume/Zoom/Voice & Audio-Video Track Forward/Reverse 53, Laser Sight & Rangefinder/Flash & Illuminator Light Button on/off button 54. Camera assistance is provided by the Laser Sight/Light & Flash 55 and Camera Audio Microphone for Audio-Video Capture and Noise Cancellation 64. The camera function is composed of visible and NIR light Camera Lens, Light/Motion Sensor 62, and Optical & Digital Zoom and Wide angle View Lens 63.

Figure 5:
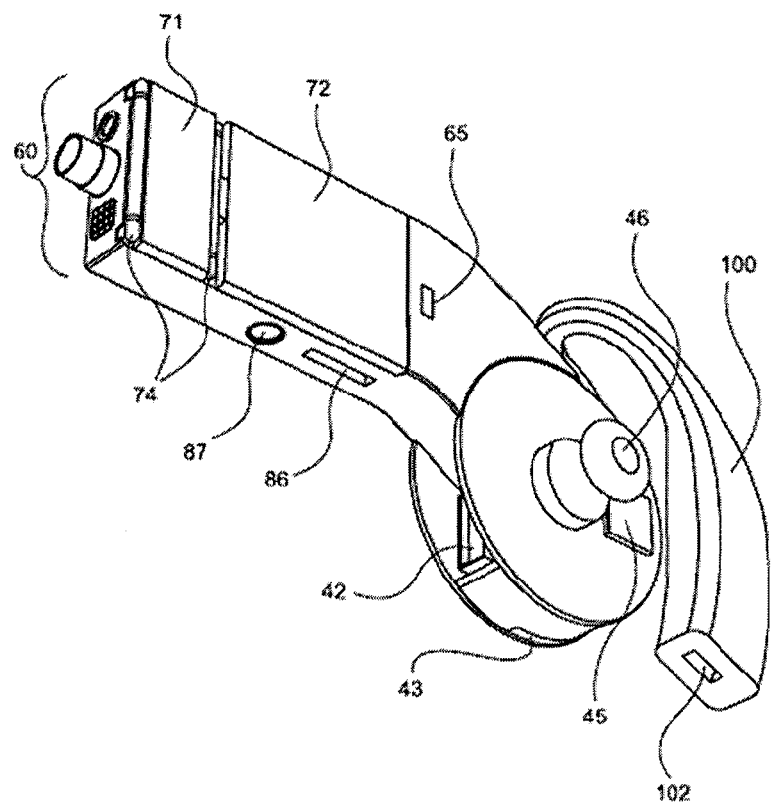
FIG. 5 is a perspective view of the single body curved headset embodiment depicting the closed clamshell cell phone viewfinder display door and dual hinged folding door panel, headset and earpiece ports, speaker and microphone.

FIG. 5 shows the modular camera phone module 25 with integrated clam shell phone components and earpiece 30 with associated ports. User components include: Folding Door Panel 71, Viewfinder Display Panel 72, Folding Door Hinge 74, SD Card (Flash Memory Port) 86, Port for Camera Mount 87, High Speed USB Port 42, Headphone Micro SD Card Port 43, Earpiece Microphone 45, Headphone Speaker 46, CP Unit Voice Microphone 65, Removable/Rechargeable Earpiece Battery Unit 100, Earpiece Headphone Battery Unit Micro USB Connector Port 102.

Figure 6:
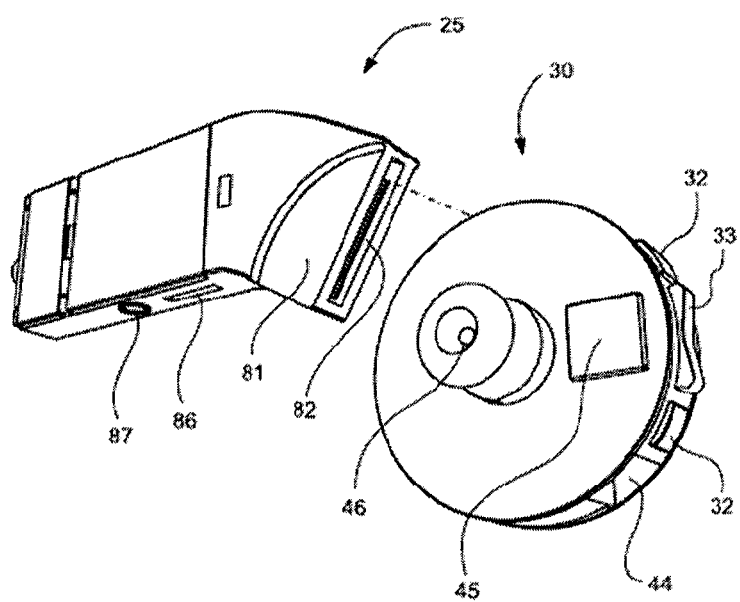
FIG. 6 is a perspective view of the detachable handheld curved CP unit embodiment and the stand-alone Headphone earpiece port unit embodiment exposing the CP unit's multimedia expansion port.

FIG. 6 shows the modular camera phone module 25 while being detached from the earpiece 30. Earpiece user components include; Menu/Select or Play/Pause Button 32, Toggle Button (Volume/Audio Track 33, External Power & Data Headphone Accessory Port(s) 44, Earpiece Microphone 45, Headphone Speaker 46. Camera phone user components include, CP Unit End-piece Docking Groove for mating with Headphone Unit 81, Multi-pin Multimedia Port/Headphone Connector 82, SD Card (Flash Memory Port) 86, Port for Camera Mount 87.

Figure 7:
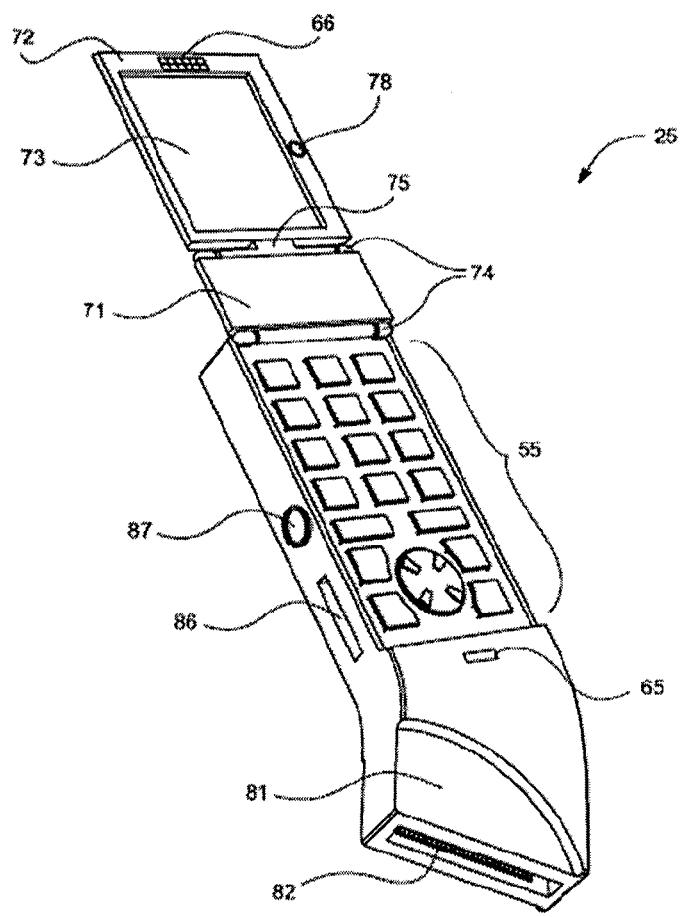
FIG. 7 is a perspective view of the handheld curved CP unit in standalone phone mode with open clamshell viewfinder display to reveal user controls, CP unit microphone, speaker and eye motion scanner lens.
Figure 8:
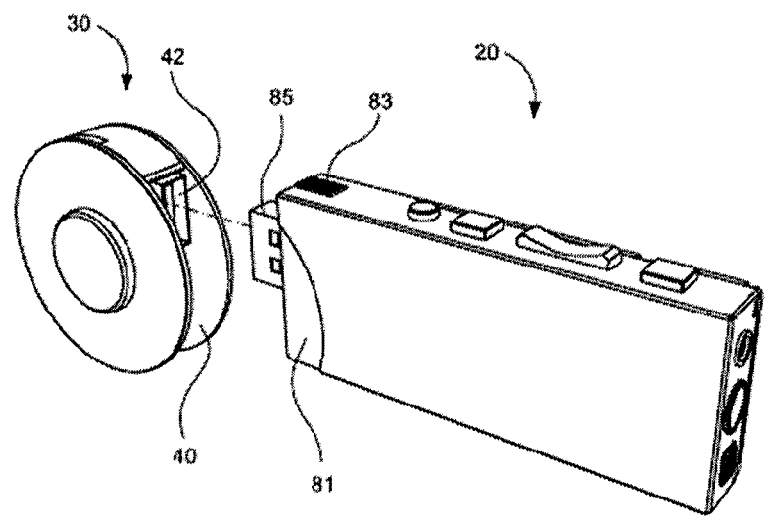
FIG. 8 depicts the rectangular handheld CP unit detached from the Headphone earpiece hub exposing the Headphone high-speed USB port and the CP unit USB connector.
Figure 9A:
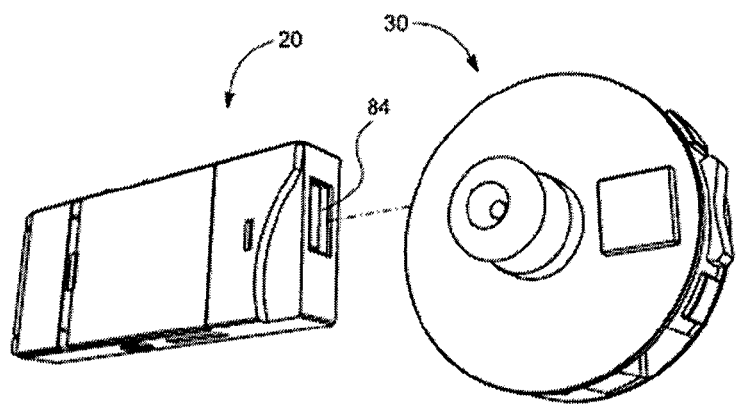
FIG. 9A is a perspective view of the standalone earpiece Headphone Unit and the stand-alone rectangular handheld CP unit with retracted USB connector.
Figure 9B:
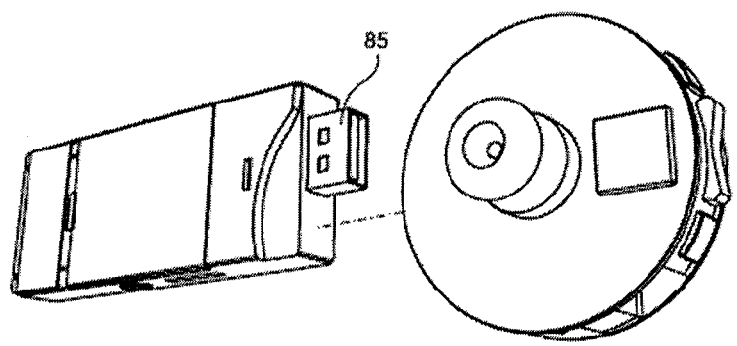
FIG. 9B is a perspective view depicting the rectangular handheld CP unit detached from the Headphone earpiece hub with extended USB connector.

FIG. 7 shows the camera phone module 25 with clam shell open for use as a handset for phone operation. Callouts identify Phone & Display Menu Button and/or Touch Screen Array 55, CP Unit Voice Microphone 65, CP Unit earpiece and camera Speaker 66, Folding Door Panel 71, Viewfinder Display Panel 72, Viewfinder/Monocular Display Screen 73, Folding Door Hinge 74, Viewfinder Tilting Hinge 75, Display Mounted Camera Lens and Eye/Facial Motion Scanner 78, CP Unit End-piece Docking Groove for mating with Headphone Unit 81, Multi-pin Multimedia & Power Port/Headphone Connector 82, SD Card (Flash Memory Port) 86, Port for Camera Mount 87.

The inventions now will be described more fully hereinafter with reference to the accompanying drawings, in which some examples of the embodiments of the inventions are shown. Indeed, these inventions may be embodied in many different forms and should not be construed as limited to the embodiments set forth herein; rather, these embodiments are provided by way of example so that this disclosure will satisfy applicable legal requirements. When appropriate, like reference numerals and characters may be used to designate identical, corresponding or similar components in differing figure drawings.

An embodiment of the invention comprises a headset 10, 12, 15, 17, 20, 25 earpiece Headphone module 30, removable/rechargeable power accessories 100, multimedia glasses accessory 120 and headset docking station 150. An exemplary embodiment of the headset comprises the following components:

Wireless Communication Device 10, 12, 15, 17, 20, 25: The headset can serve as a standalone wireless communication device. In standalone mode, it does not require any paired device to communicate with other wireless devices. It functions similar to a standard wireless phone and communicates with other devices over a network, whether connected wirelessly or wired.

Built-in Video Camera 62: The built-in still image and audio-video camera is used to capture the video stream and record to local flash memory storage 86 or streamed wirelessly to the other devices over wide, metro, local or personal area network or to a network server for storage. The camera has light and motion sensor detection capability and daylight and near infrared night vision sensors making it usable in daylight and extremely lowlight nighttime conditions. The camera also responds to manual 50, hands-free voice and remote control instructions received through the headset. The camera is also designed to operate in sync with the user natural eye movements 13 and focusing via an eye and facial scanning and recognition system 14 for hands-free automated eye to camera zoom functions.

Optical and Digital Zoom: The camera incorporates internal and external optical zoom lenses 63 for both close up (macro) and wide angle viewing and/or digital zoom for extended zoom capabilities.

Power Source: The headset is powered by integrated and/or externally attached batteries 100. The batteries are removable, replaceable, and/or rechargeable. Alternately, the headset can be powered from a wired connection 102 with an external battery or power supply wired directly to the electrical grid.

Storage Device: The audio/video captured by the video camera 62 and microphone 64 can be stored in the removable persistent storage of the headset 86. Embodiments of the invention provide, for example, two types of storage: RAM storage and FLASH storage that is built into the headset, and a removable storage device that is plugged into the headset, e.g. an SD card or similar device. The earpiece contains a SD slot 43 for storage of audio files.

GPS Location: The headset has a built-in GPS location receiver. This can be used in location contextual decision making or data processing.

High Intensity Light source: This is a source of light 61 when needed for the video shooting or taking still images. It can also be used as a flash for low-light still image capture.

Laser Sight and Range finder: A target sighting FIG. 12 and range measurement sub-system 61 for obtaining accurate distance reporting and automated camera zoom functions.

Figure 10A:
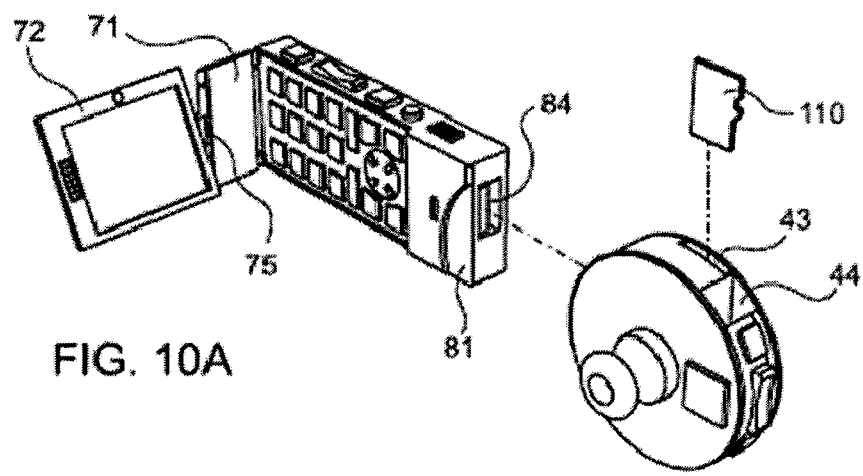
FIG. 10A is a perspective view depicting the rectangular handheld CP unit detached from the Headphone earpiece hub depicting the CP unit in handheld video camera mode with tilted viewfinder screen.
Figure 10B:
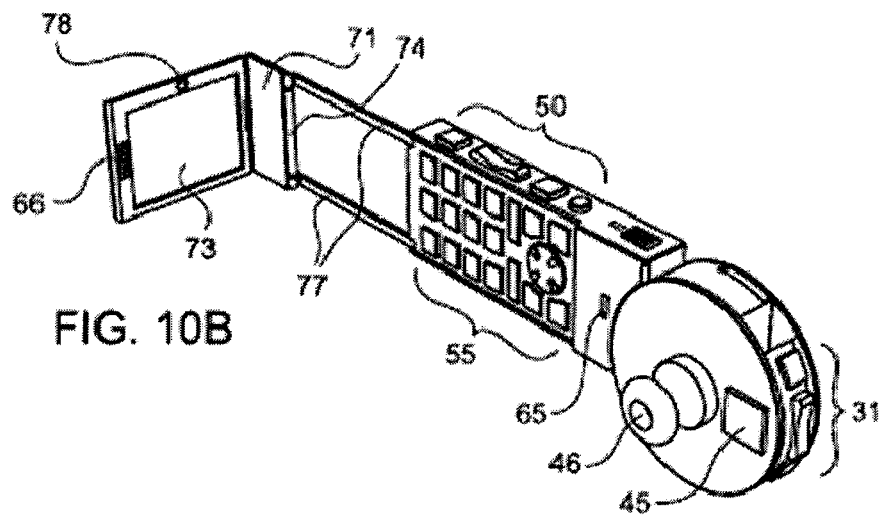
FIG. 10B is a perspective view depicting the rectangular handheld CP unit attached to Headphone earpiece hub in headset mode with the viewfinder and extension arms fully extended in monocular display mode.
Figure 10C:
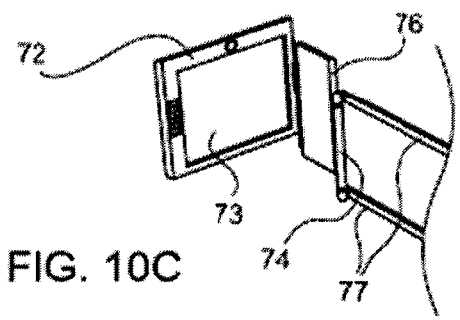
FIG. 10C is a perspective view depicting the adjustability of the retractable monocular viewfinder display.
Figure 11A:
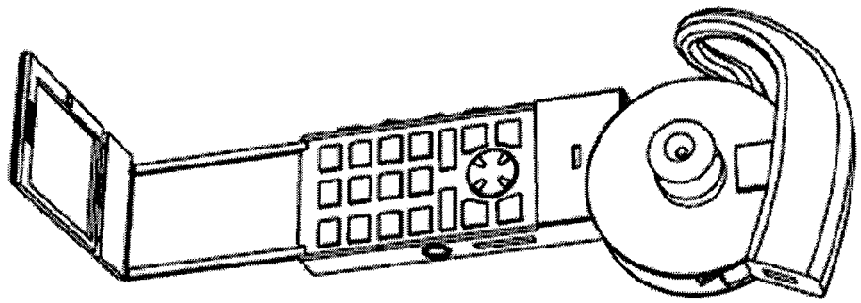
FIG. 11A is a perspective view depicting the rectangular CP module, connected to the earpiece, with monocular display extended.
Figure 16:
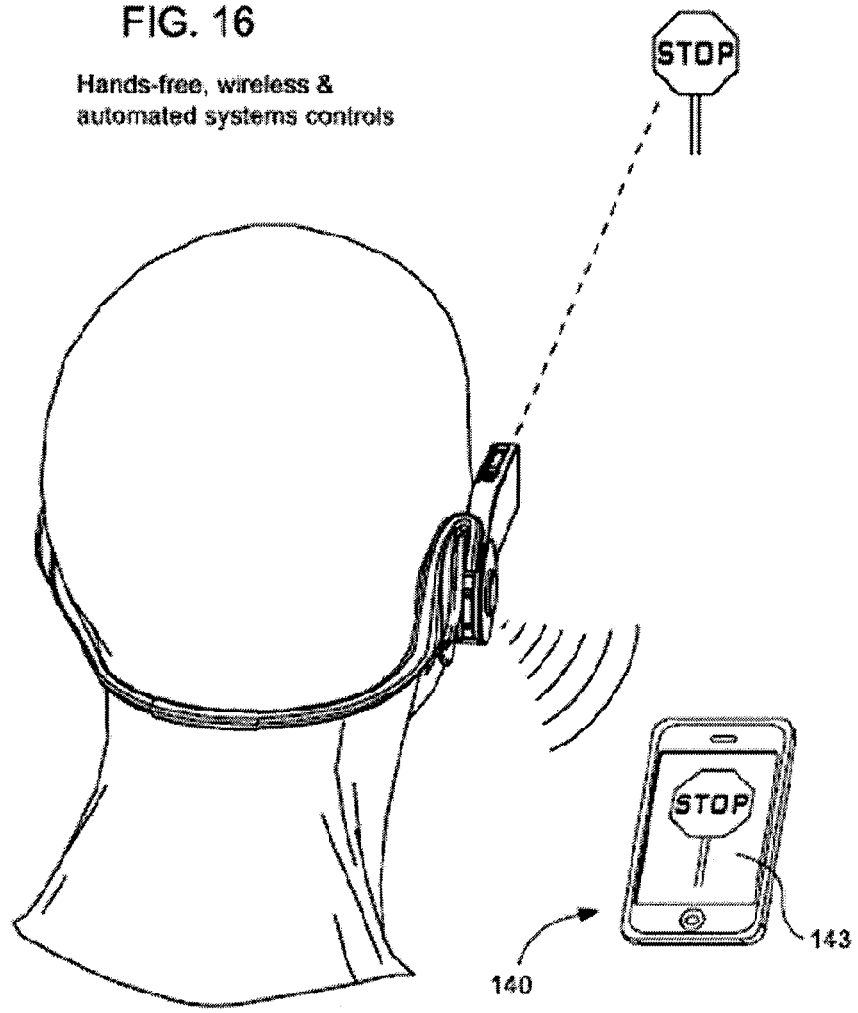
FIG. 16 is a perspective view depicting the camera image and/or live video feed displayed on a paired handset as a remote viewfinder supplied by a wireless link.
Figure 17A:
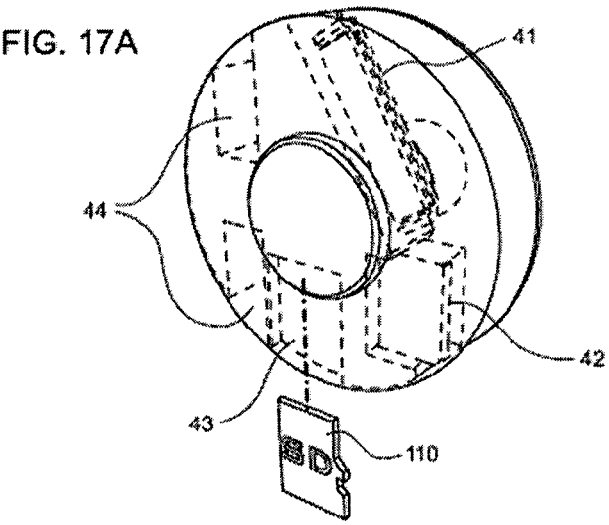
FIGS. 17A and 17B is a perspective view depicting the reversible earpiece Headphone and the earpiece multimedia and high speed USB Ports, SD Card and external battery ports.
Figure 17B:
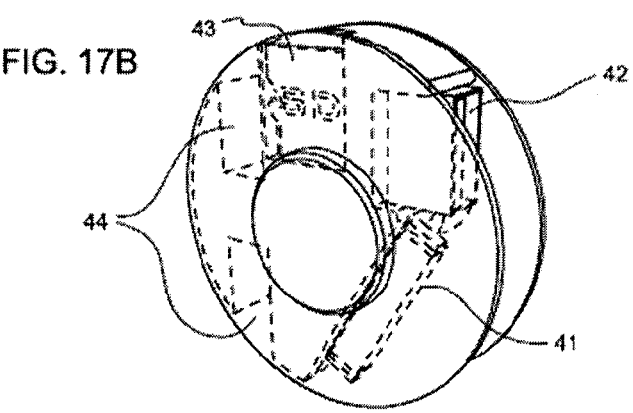
Figure 18:
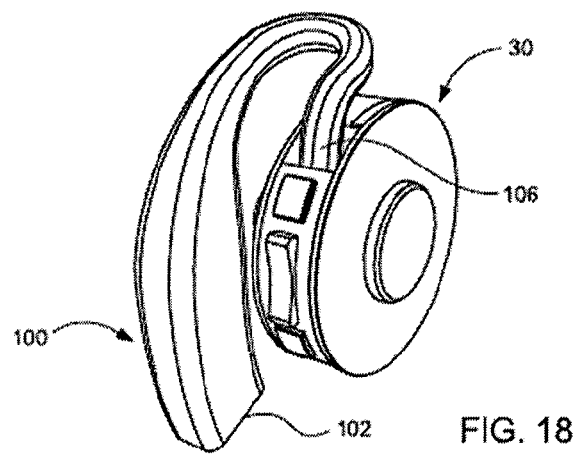
FIG. 18 is a perspective view depicting the Headphone module with the ported earpiece battery unit.
Figure 19:
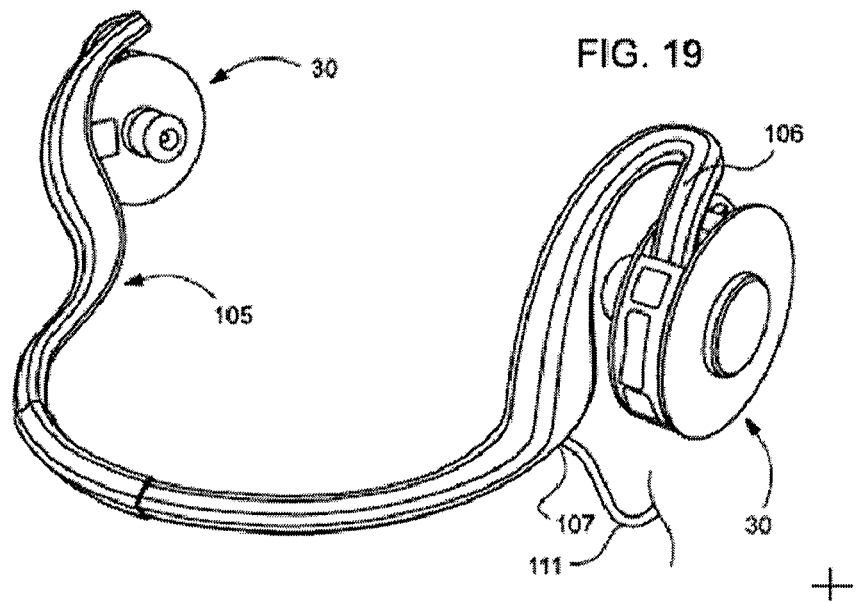
FIG. 19 is a perspective view depicting the behind-the-neck battery unit connecting both a left and right Headphone module.
Figure 20:
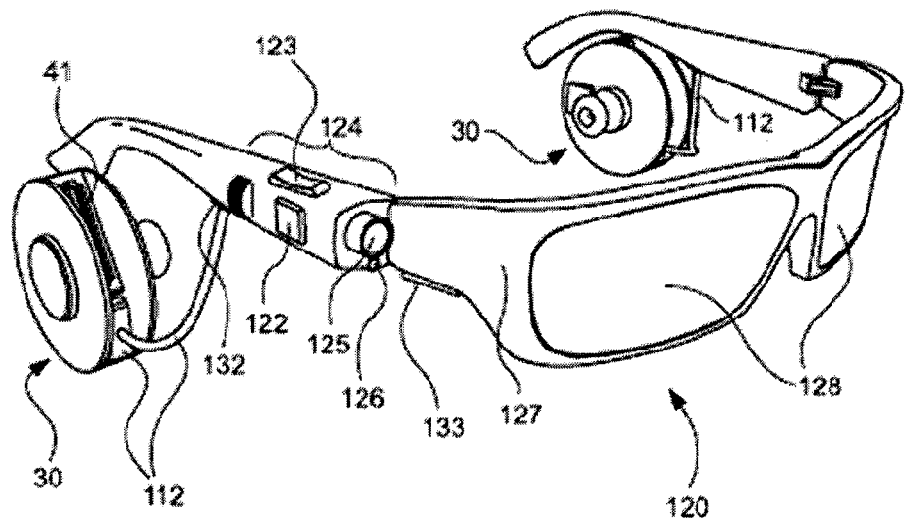
FIG. 20 is a perspective view depicting a pair of multimedia video display sunglasses with left and right arm optical zoom video cameras with USB connections to a left and right earpiece Headphone multimedia hub.
Figure 21:
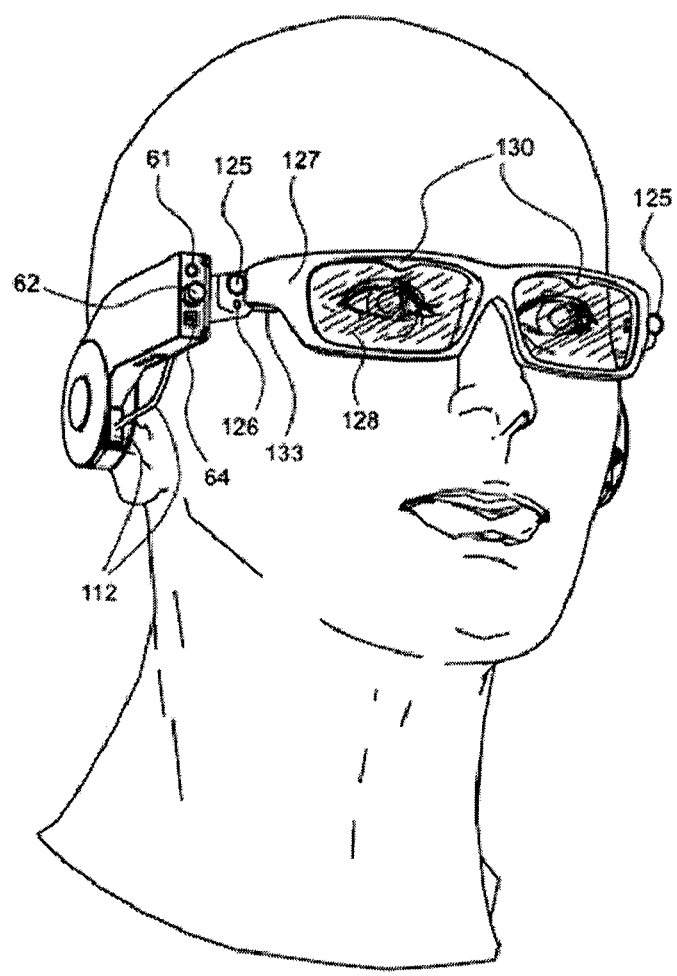
FIG. 21 is a perspective view depicting the multimedia sunglasses with left and right eye motion scanners interfaced with a left and right earpiece headphones and the CP Headset module.
Figure 22A:
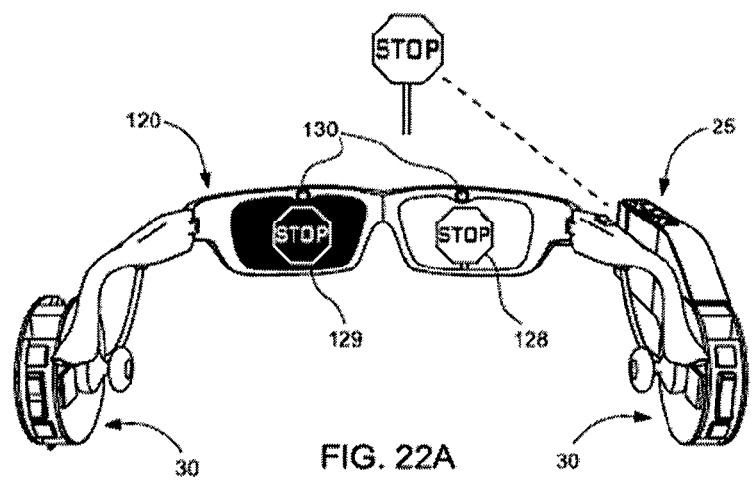
FIG. 22A is a use case depicting day and night vision display options in synchronization with the headset day and near IR night vision camera video capture modes.
Figure 22B:
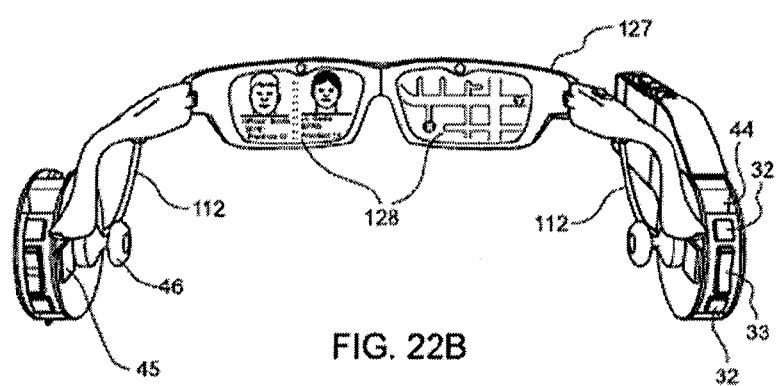
FIG. 22B is a use case depicting binocular viewfinder display sunglasses and the CP Headset for hands-free wide area telecommunications and teleconferencing.
Figure 23:
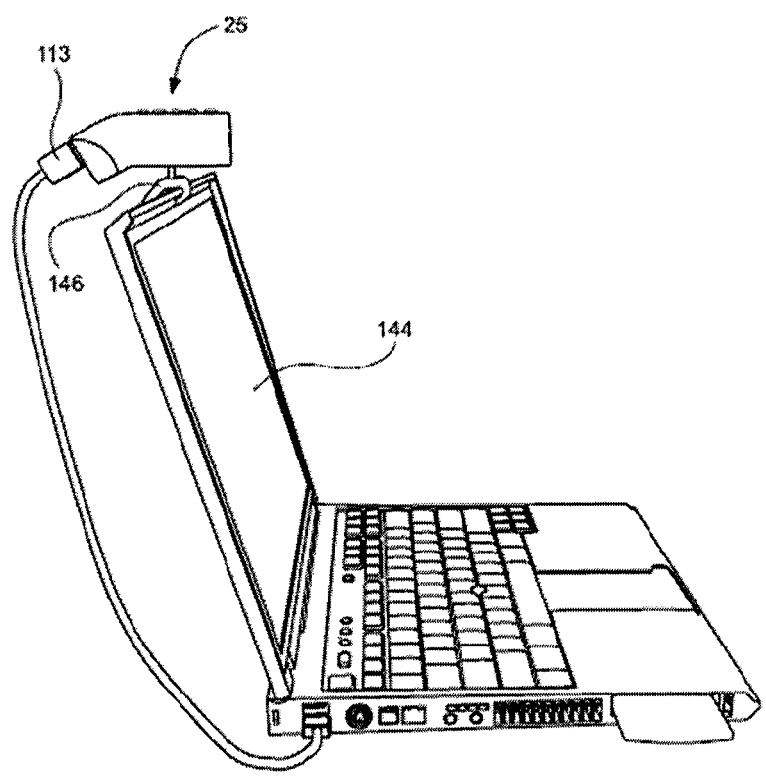
FIG. 23 is a use case showing the CP module used as an IP camera (webcam) while mounted to the top of a host laptop computer.
Figure 24:
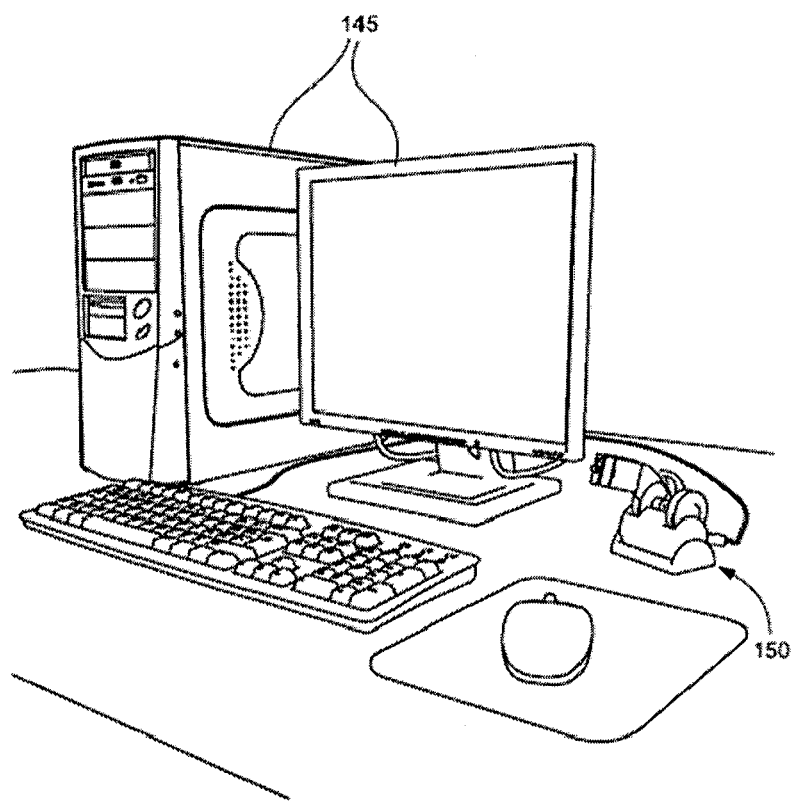
FIG. 24 is a use case showing the docking station interfaced to a host desktop computer with ports for charging the CP module and earpiece Headphone module while utilizing the CP Headset as a webcam.
Figure 25:
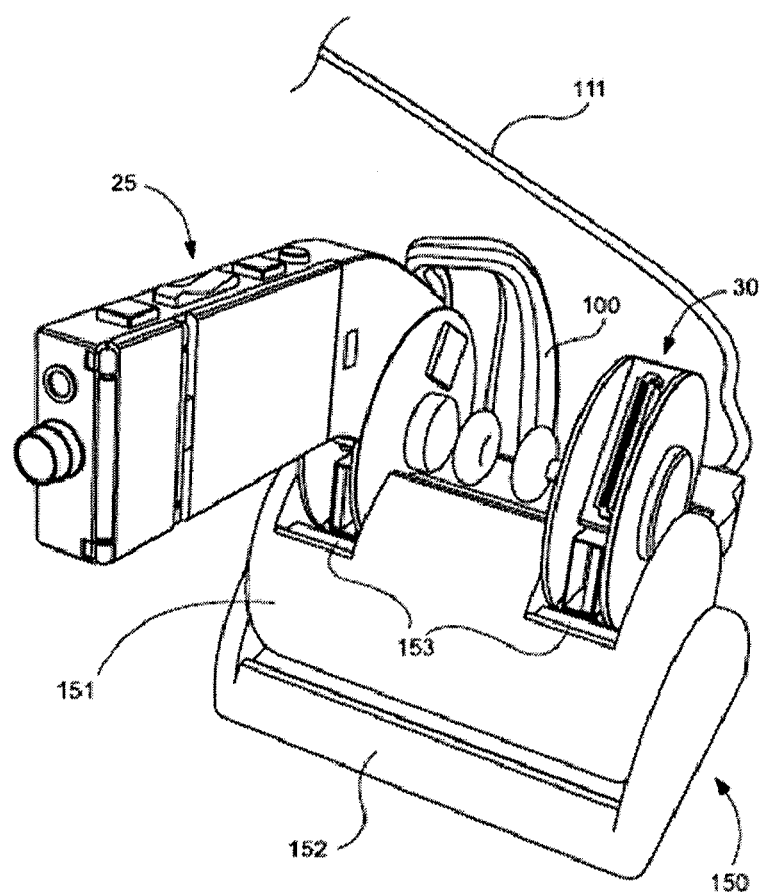
FIG. 25 is a perspective view depicting the docking station with adjustable rocker port for charging the CP module, left and right Headphone modules and for use of the one-piece headset and/or CP module as a webcam.

Viewfinder and Monocular Display: The headset has a built-in adjustable 74, 75, 76 and extendable 73 clamshell phone display 70 and camera viewfinder FIG. 10A that can be extended out from the headset/camera phone module and worn over the eye as a monocular display FIG. 15A for real-time hands-free viewing of captured and/or received video feed. The clamshell display has a built-in speaker 66 for use as a handheld phone and/or speakerphone for audio-video playback functions. The clamshell display contains a second optical lens 78 for self image capture and mobile teleconferencing when in handheld cell phone mode or as an eye and facial scanning device for security and automated eye to camera controls when worn over the eye as a monocular display.

The headset power accessories include numerous embodiments of removable/rechargeable batteries. A docking station 150 comprised of a seat 153 for the headset for storage, battery charging, host connection 111, or any other operational purpose. The docking station capabilities include:

Seat: The headset is placed in the docking station when not in use or when charging batteries or uploading/downloading the data from the headset.

Power Recharger: The docking station provides power for recharging module batteries. When the headset is placed in the docking station and its battery has been drained, the docking station draws the current from the host USB or wall outlet and recharges the battery. The recharger is designed to work on global power grids (110-220 VAC, 50-60 Hz).

Headset Administration and Configuration: The docking station is a computer 145 pluggable device via a USB interface. It can be used for administering and configuring the headset by placing it in the docking station. The headset administration software installed on the computer provides a simple and user-friendly interface to administer and configure the headset. The headset operates as one of the following USB class devices; 1) Mass Storage 2) Video 3) Communication.

Headset Operations

Figure 26:
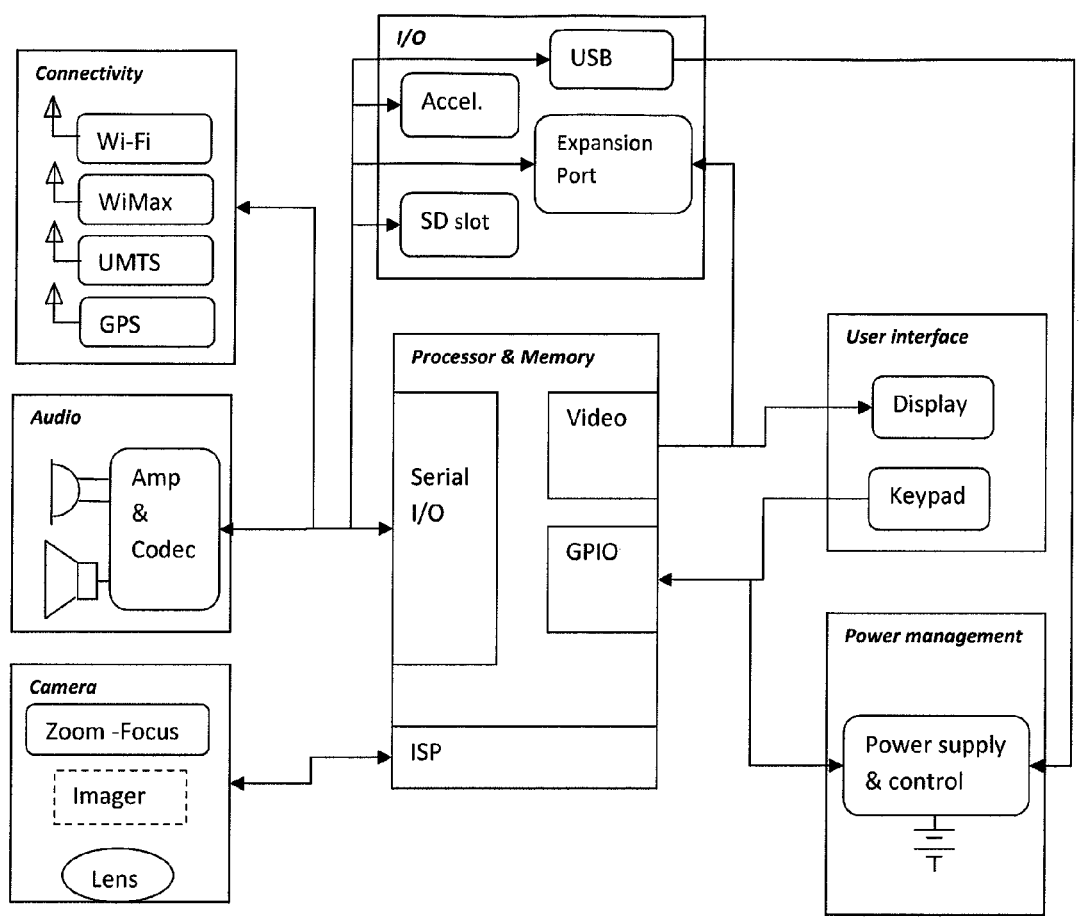
FIG. 26 is a schematic diagram showing a high-level hardware architecture for the headset according to the invention.

FIG. 26 illustrates the functional electronic sub-systems of the camera/phone module.

Figure 27:
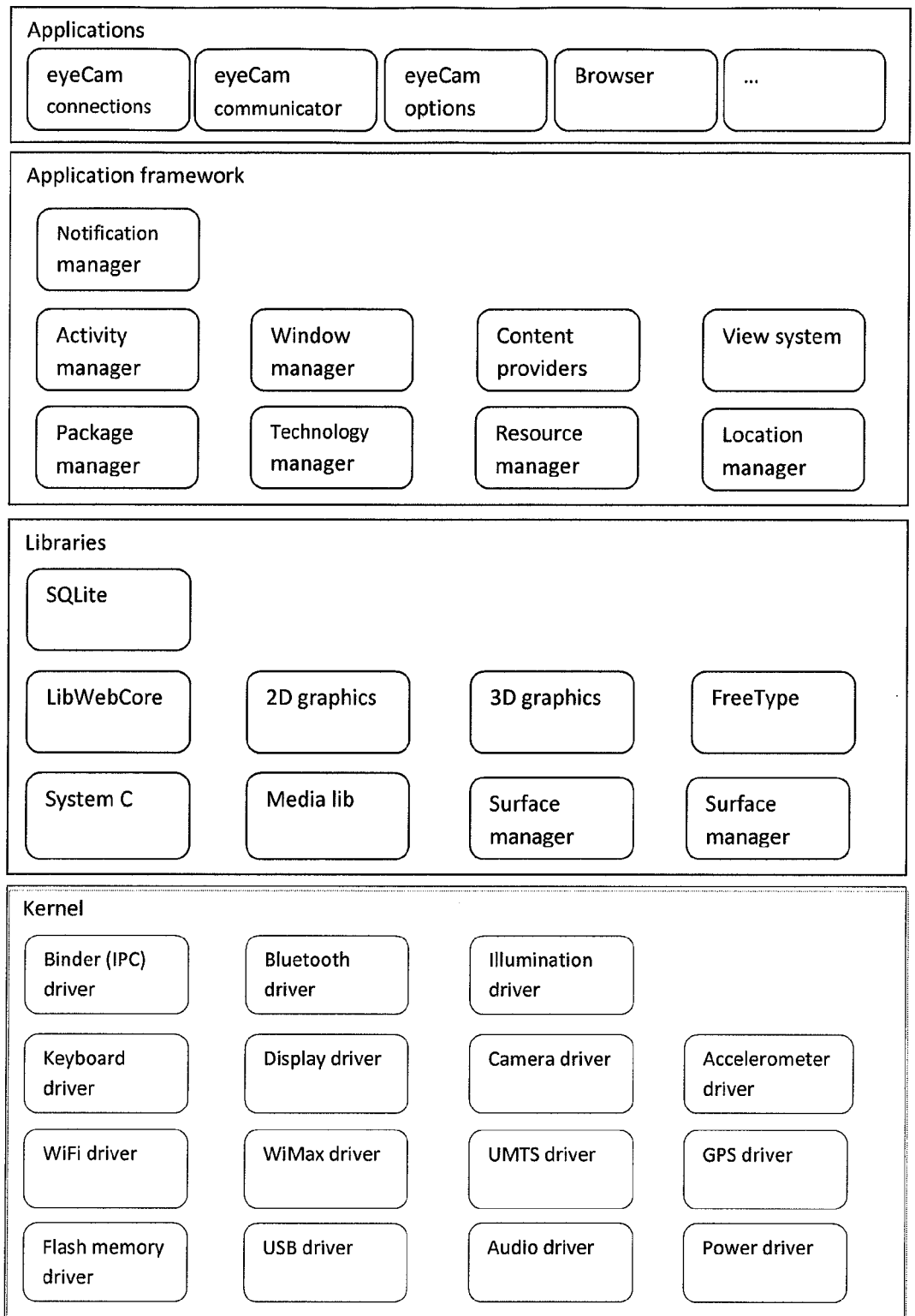
FIG. 27 is a schematic diagram showing a high-level software architecture for the headset according to the invention.

FIG. 27 illustrates a representative software architecture running on the camera/phone module.

Figure 28:
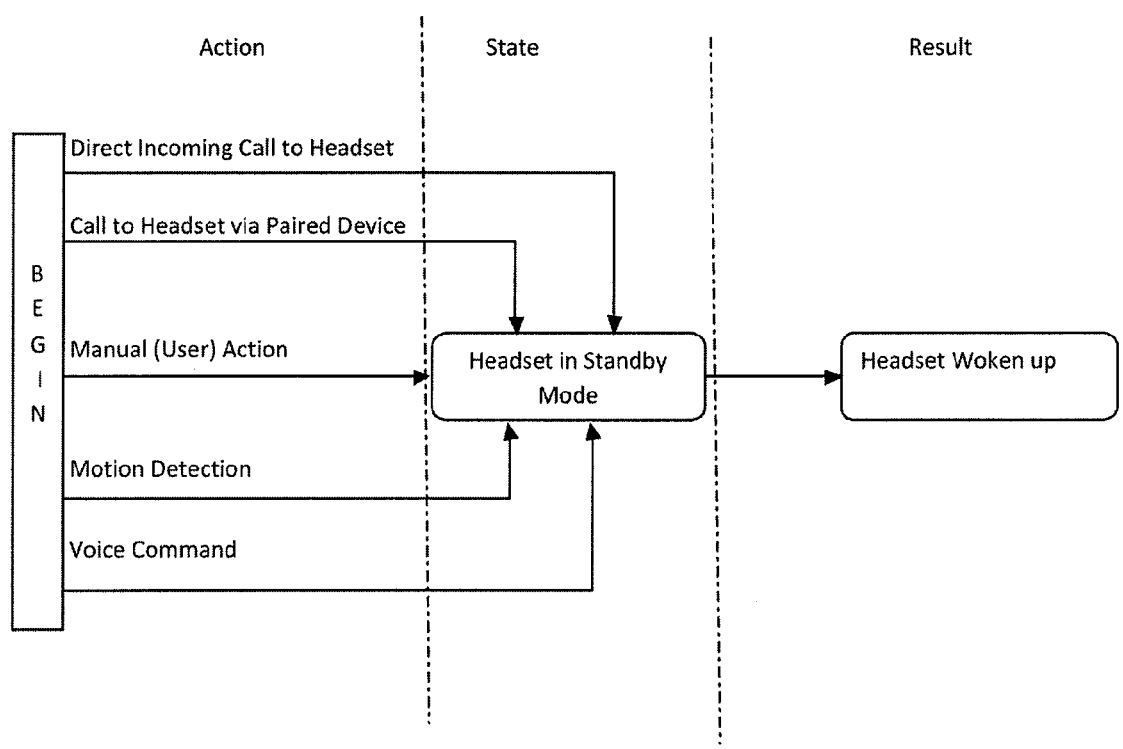
FIG. 28 is a headset state transition diagram according to the invention.

FIG. 28 is a headset state transition diagram according to the invention. When the headset is switched on, the headset is always in the standby mode, similar to a telephone. The headset remains in the standby mode until an external event wakes up the headset. There are multiple ways the headset can be awakened, for example:

Incoming call (Direct to headset);
Incoming call through a paired device;
Manual action by the user;
Motion detection;
Voice command;
Device Authorization & Security
Scheduled; event, context, network and
Location based.

Post-awake Headset Operations

Figure 29:
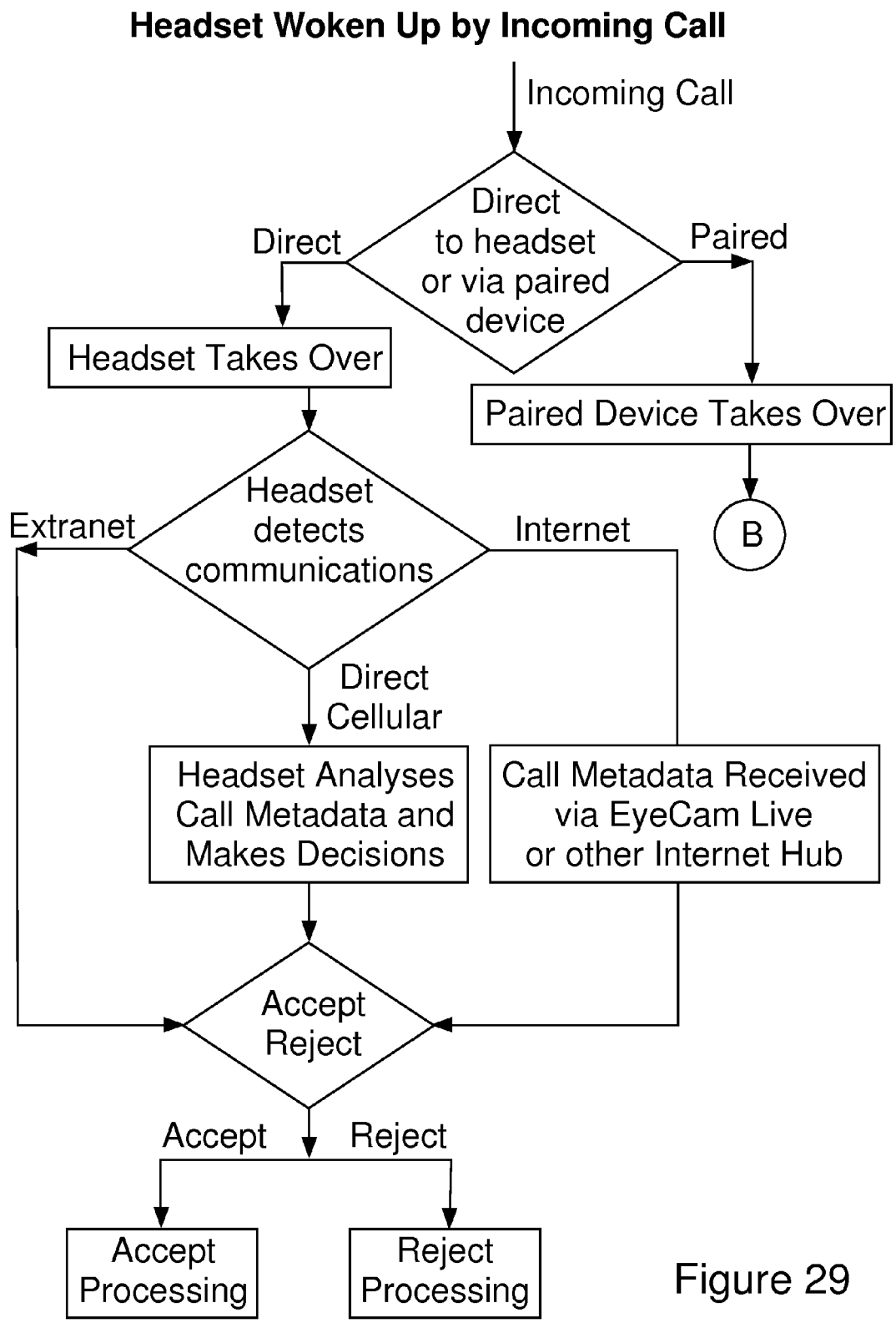
FIG. 29 is a flow diagram showing a headset awakened by an incoming call according to the invention.
Figure 30:
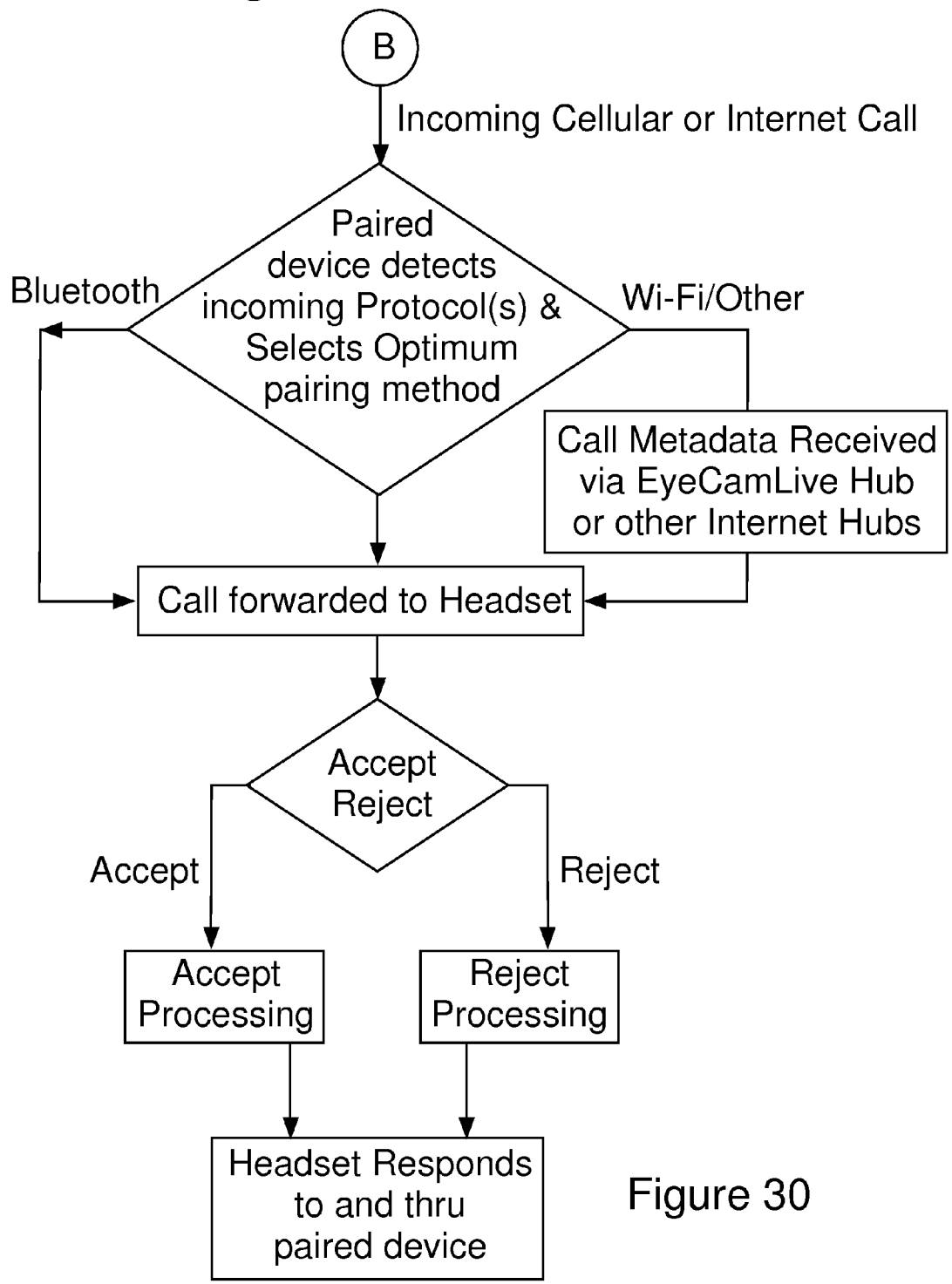
FIG. 30 is a flow diagram showing an incoming call via a paired device according to the invention.

FIG. 29 is a flow diagram showing a headset awakened by an incoming call according to the invention, and FIG. 30 is a flow diagram showing an incoming call via a paired device according to the invention.

After headset is awakened as a result of one of the actions listed above, the headset is ready to perform one or more of the following actions:

Record/Capture
  Voice Only
  Audio-Video
  Video-only
  Still image
  Voice and Video
  Data Only
  Multimedia and Data Call Type
  Voice
  Audio-Video (Streaming)
  Audio-Video (Streaming & Receiving)
  Voice and Video (Streaming & Receiving)
  Metadata System Control
  Intrinsic system control
  Manual system controls
  Hands-free systems controls
  Automated system controls
  Paired system controls
  Remote system controls—Hub or Wireless System Controls The following paragraphs explain the system controls in detail.

Intrinsic System Controls

These are the controls that operate inside the headset as a part of the headset operating system. These controls are essential to the proper functioning of the headset. These controls are activated as soon as power is switched on and run continuously until the headset is switched off. The major subsystems of the intrinsic controls are:

Power systems—storage, management
Memory management
Camera controls
  Imager initialization
  Imager data acquisition (during still image and video capture)
  Image stabilization (during image capture)
  Optical and digital zoom (during image capture)
  Laser Rangefinder and automated zoom (during image capture)
  Still Image Capture/Video or Audio-Video record
  Motion Sensor
  Light Sensor
  Day/Near Infrared Night Vision Sensor
  Audio controls
Wireless Activation/Listen/Streaming/Networking
Cellular
Wi-Fi
GPS
Bluetooth
Multi-channel
Still Image/Video or Audio Video Stream to Internet
Voice, Audio-Video or Voice and Video Call (Two-way/multi-feed)

Cellular, IP Phone and/or IP Camera, router/hot spot modes
Stand-alone, Linked/Ported, wired or wireless paired and/or group device networking modes
Audio Systems & Volume controls
Camera/Phone Voice Microphone, AGC
Earpiece Voice Microphone, AGC
Video Camera microphone, AGC
Camera/Phone Speaker
Earpiece Speaker
Auto Phone/Earpiece Microphone/Speaker on/off (When CP unit is ported with the earpiece unit, CP Microphone and speaker automatically shut down and earpiece microphone and earpiece speaker take over (Video Camera Microphone remains on for Noise Cancellation)
Speaker, Earpiece volume change request
Noise Cancellation system using camera microphone and voice recognition system
Security Controls
Voice recognition/command
Retina Scan recognition
Speak on key-in Device pass code
Device/IP ID recognition
User/Group/Network Authorization
GPS/Location Manual Controls These controls 50 and 31 are operated by the user by pressing the onboard buttons and switches. These controls include:

Camera Control Buttons 50, Switches and Mount 87
Set button to initiate a particular setting
Toggle button for lens zoom in/out or Volume Control or Forward/Rewind button for audio video playback
Laser sight and rangefinder on/off
Light/Flash on/off
Day/Near Infrared Night Vision Camera Modes
Start/stop/pause video recording or still image capture
On/Off Button to start hands-free voice command
Menu and settings Button
USB Port Extend/Retract switch
Camera mounting fastener 87
Earpiece Control Buttons & Switches 31
Outcall/Respond to incoming call button
Call or Speaker Volume/audio file scan/forward & rewind toggle button
Menu and settings button
External hot swap battery port release switch
High speed USB and Multimedia Port
Dual External Power and headset accessory ports
Phone Control Buttons 55, Switches & Display 73
Numerical Button key pad with menu and left right function buttons
Security controls as listed above in the section entitled Intrinsic System Controls
Viewfinder with extension system for use as a monocular display Hands-Free Device Controls These controls include all non-button or physical array manual and semi-automated hands-free user control systems for the device, communications and/or camera operations including;

Voice Command
Motion Gesture Recognition
Optical Scan and Eye and Facial Recognition
Laser Rangefinder and automated optical and/or digital zoom
Light Sensor for day and near infrared night vision camera
Motion Sensor and accelerometer Paired Device Controls These controls are similar to manual control. However, the controls are operated using a paired device. These controls include all of the manual controls listed above. In addition, the paired device's screen acts as a remote viewfinder for the control operation.

Headset Operational Systems

Figure 31:
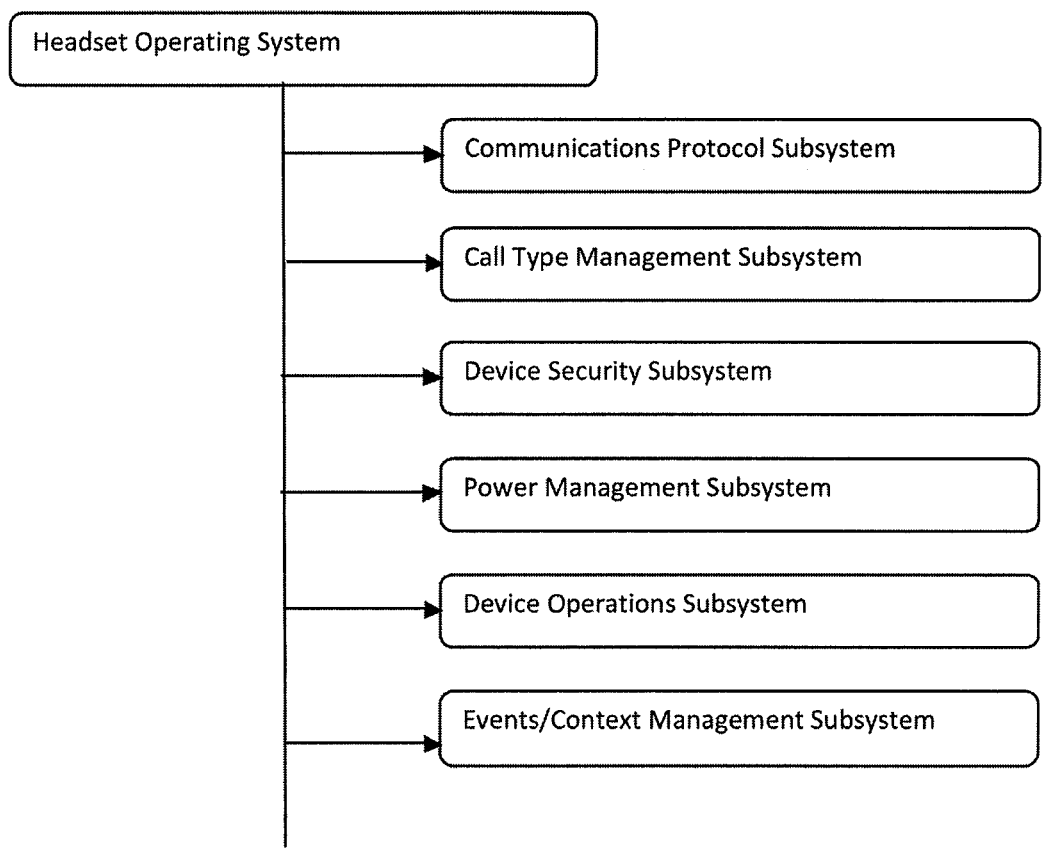
FIG. 31 is an architectural diagram showing headset operational systems for a headset operating system according to the invention.

FIG. 31 is an architectural diagram showing headset operational systems for a headset operating system according to the invention. The functioning of the headset is managed by the headset operating system that is embedded in the device. The operating system, in turn, comprises several subsystems that handle specific operation within the headset. These subsystems include:

Communications Protocols Subsystem
Call Type Management Subsystem
Device Security/ID Subsystem
Data Management and Storage Subsystems
Power Management Subsystem
Device Operations Subsystem
Event/Context Management Subsystem Communications Protocols Subsystem The headset supports multiple wireless communication protocols. These include cellular, WiMax or Wi-Fi and Bluetooth. The communications protocols subsystem manages all the incoming and outgoing communication for the headset. The headset will participate in a network infrastructure (client-server) or ad-hoc (peer to peer) arrangement. Attributes of a Mobile Ad-hoc Network (MANET) will allow network connected units to share and forward data when operating in a mesh. Internet telephony is the conduit for the multimedia data streams operating on wideband IP networks. The TCP/IP stack will be IPv6 and IPSec compliant. The TCP/IP stack provides IP sockets for duplex inter-process communication amongst processes or threads for the delivery of multi-media data and control messages. The Session Initiation Protocol (SIP) will be used for multimedia session creation with Real-time Transport Protocol (RTP) for voice and video stream distribution.

Call Type Management Subsystem

Figure 32:
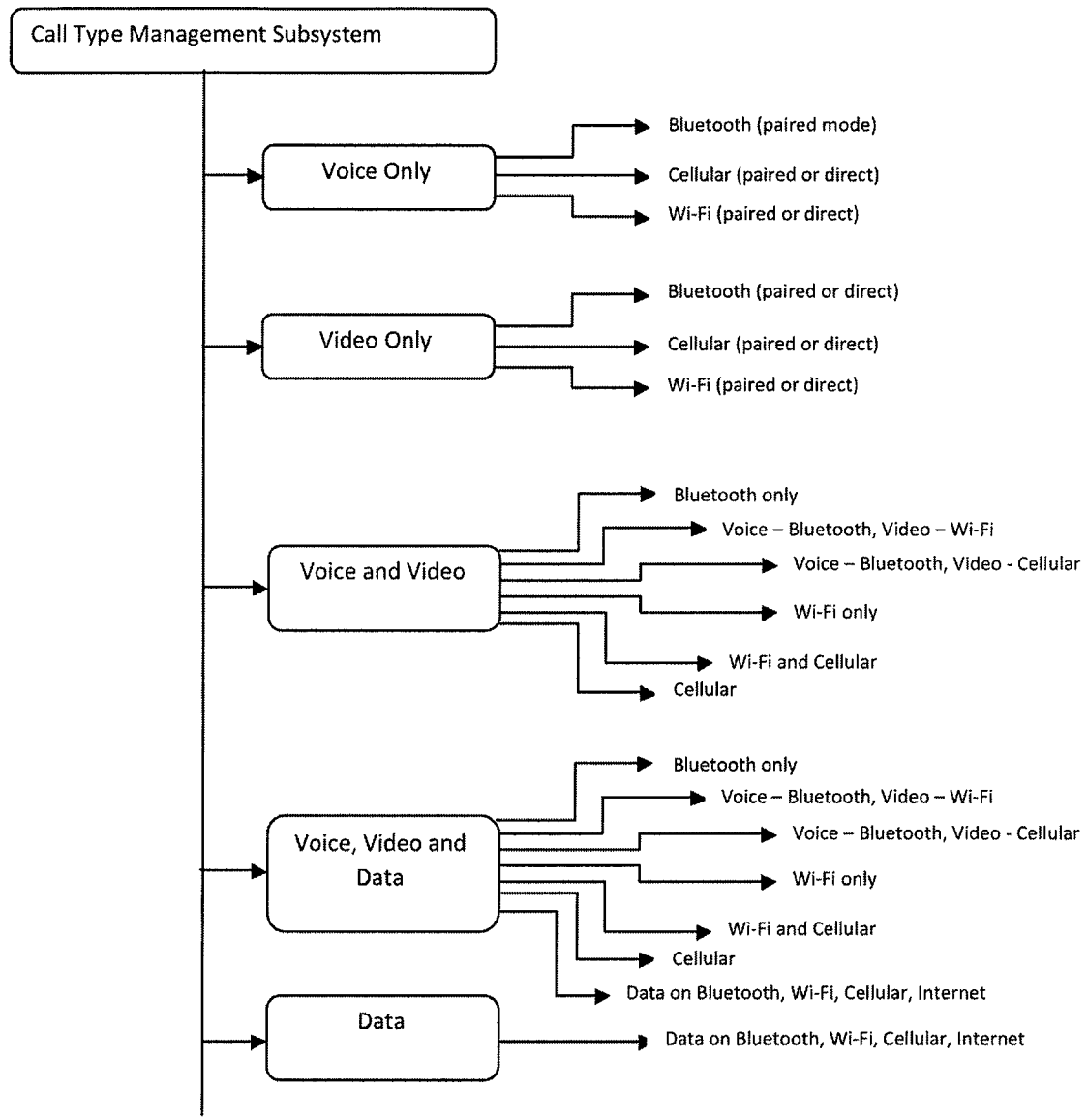
FIG. 32 is an architectural diagram showing headset operational system for a call type management subsystem according to the invention.

FIG. 32 is an architectural diagram showing headset operational systems for a call type management subsystem according to the invention. The headset is capable of operating in multiple combinations of voice, audio, video, and data calls. Depending upon the type of call, the headset chooses one or combination of the available wireless communication protocols.

Device Security/ID Subsystem

Figure 33:
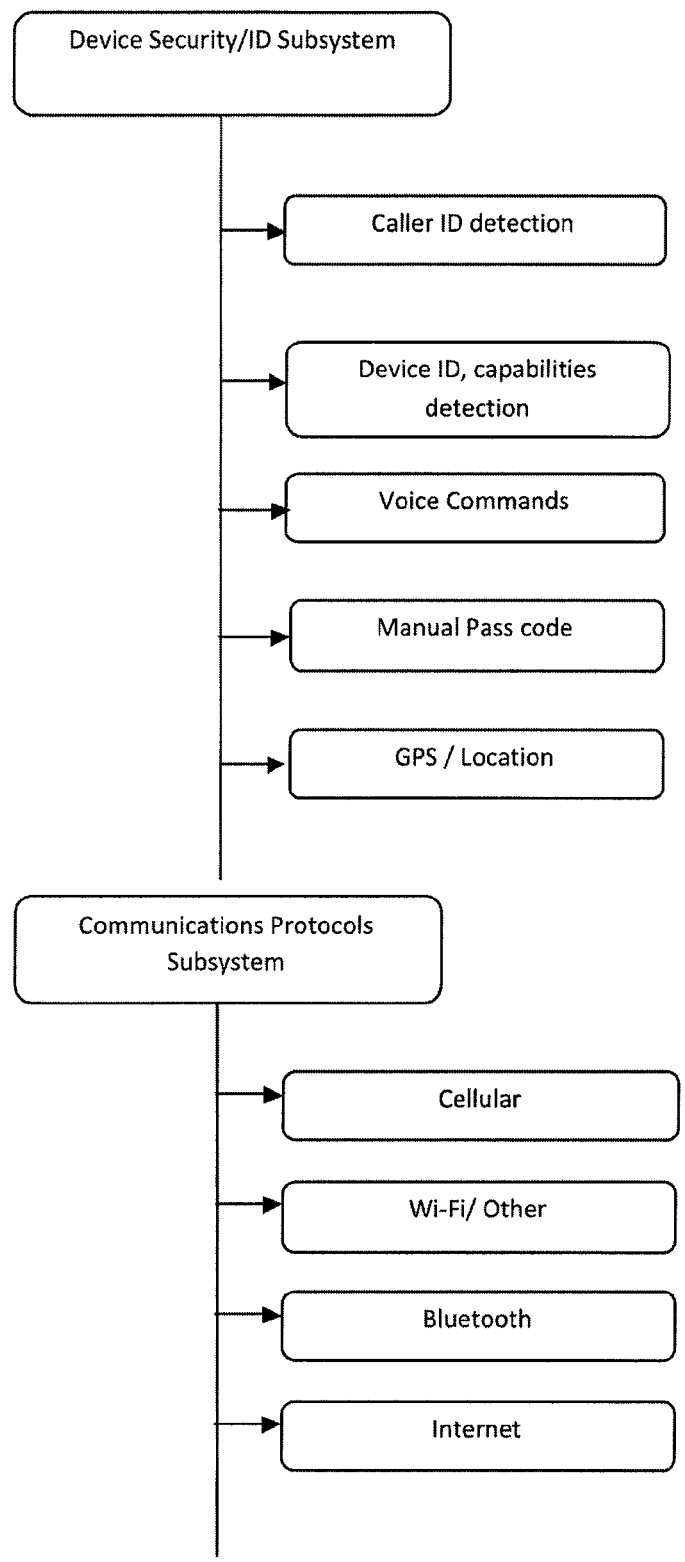
FIG. 33 is an architectural diagram showing headset operational systems for a device security/ID subsystem according to the invention.

FIG. 33 is an architectural diagram showing headset operational systems for a device security/ID subsystem according to the invention. The headset provides for security requirements. Some of the salient security features include caller ID detection, caller device capabilities detection, manual passcode, voice commands, AND GPS/Location. The security subsystem is primarily used for access to headset. When switched on, the headset requires the user to key-in or speak the pass-code, similar to password for computer logins, to allow access to the headset. Similarly, the headset can accept or reject the incoming calls automatically based on the pre-configured calling numbers. In addition, the location of the headset can be used in defining the behavior of the headset, e.g. the headset may automatically switch on or off when in certain location.

Power Management Subsystem

The headset powered by at least any of two sources: removable and rechargeable batteries; and grid power when the headset is seated in the docking station. The power management subsystem manages the power consumption of the headset. It makes operational decisions, such as what communication protocol to use, whether to use camera light or not, recording options, or any other action that involves power consumption. These decisions optimize the power consumption.

Figure 34:
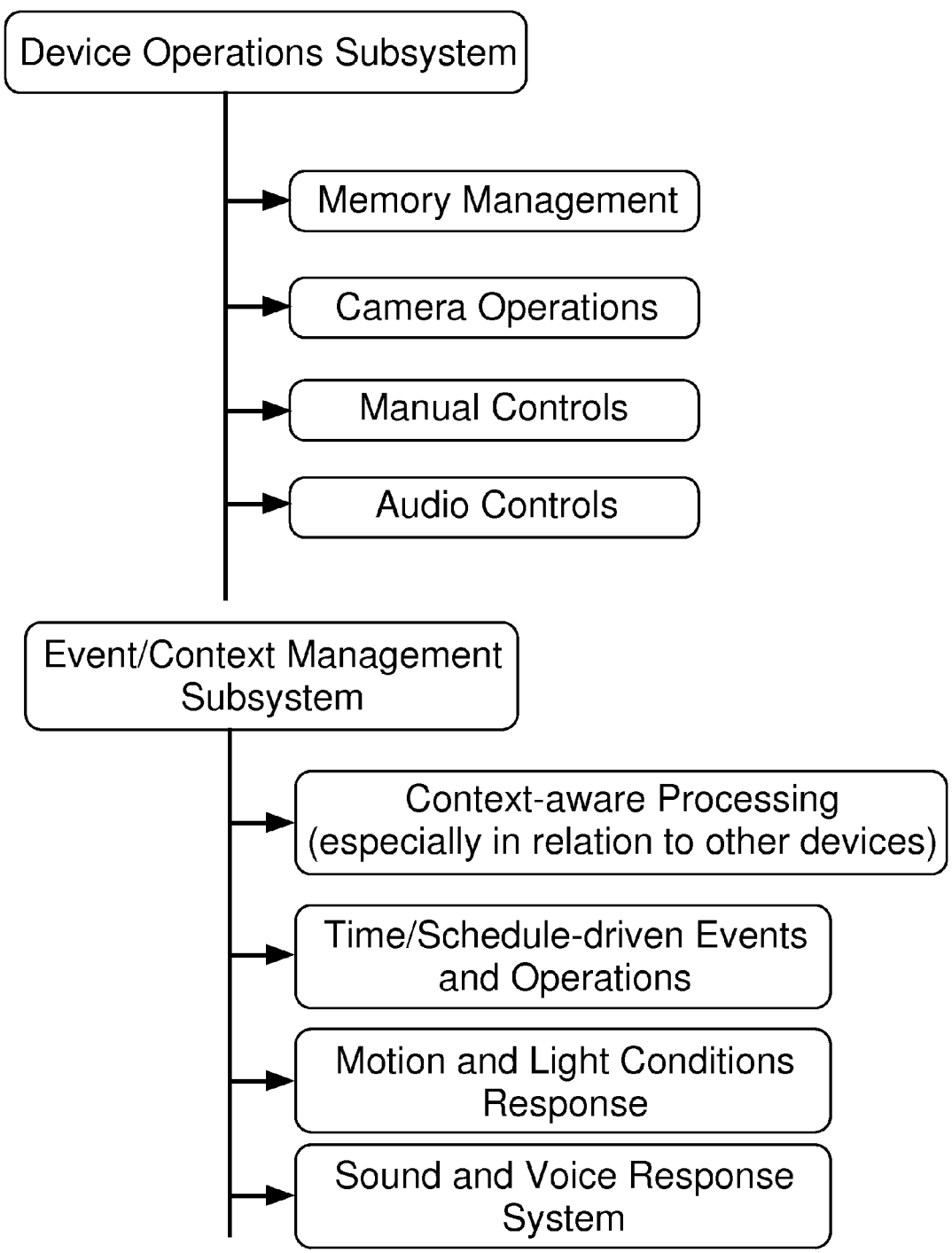
FIG. 34 is an architectural diagram showing headset operational systems for a device operations subsystem and a device event/context management subsystem according to the invention.

FIG. 34 is an architectural diagram showing headset operational systems for a device operations subsystem and a device event/context management subsystem according to the invention Device Operations Subsystem The device operations subsystem manages the behavior of the headset itself. It is further subdivided into lower level of subsystems such as camera controls, memory management, manual controls, hands-free controls, video codec control, user display output, and audio controls.

Events/Context-Driven Subsystem

This subsystem responds to the external events or the external context of the device. For example, the headset may switch itself on or off when in a specific location or time of the day; the camera may begin recording when the motion sensor is activated and/or begin broadcasting live or recorded audio-video content to the Internet or directly to one or more authorized networked devices, the flashlight, laser sight and/or night-vision sensor may be activated automatically if the quality of the light degrades, etc.

Modes of Communication

Figure 35:
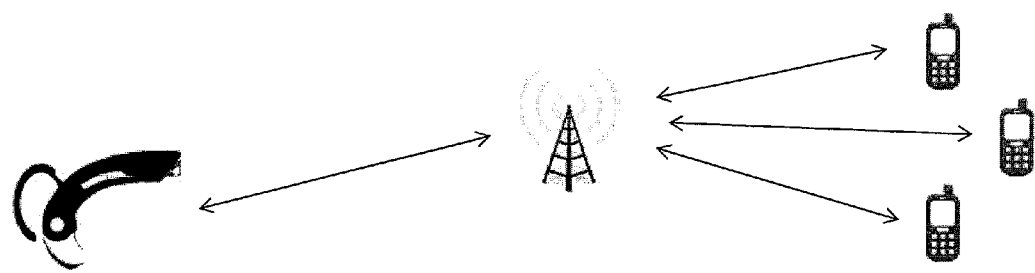
FIG. 35 is a schematic diagram showing communication between the headset with paired device and other mobile devices according to the invention.

FIG. 35 illustrates the communication between the headset and external mobile devices via a cellular network. The headset has no paired device. The headset directly connects to the cellular network. The camera in the headset captures a video stream and the microphone captures sound. The headset can optionally store the audio/video in the onboard storage or output the stream directly to external world over the cellular network. The head connects to a live hub over a cellular network. A client computer makes a direct Internet TCP/IP connection with the live hub.

Figure 36:
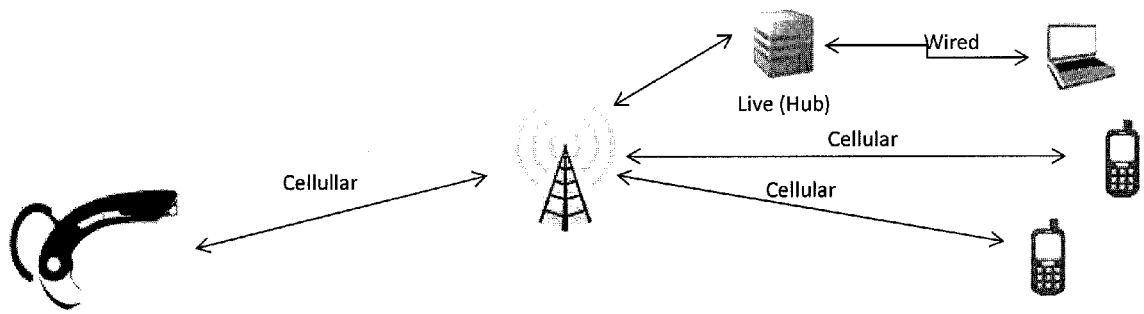
FIG. 36 is a schematic diagram showing communication between the headset and mobile devices through the cellular network according to the invention.

FIG. 36 illustrates the communication between the headset and external mobile devices via a cellular network. The headset has no paired device. The headset directly connects to the cellular network. The camera in the headset captures a video stream and the microphone captures sound. The headset can optionally store the audio/video in the onboard storage or output the stream directly to external world over the cellular network. The head connects to a live hub over a cellular network. A client computer makes a direct Internet TCP/IP connection with the live hub.

FIG. 37 depicts communications between a headset paired with a mobile device and external mobile devices via a cellular network. The headset and the paired mobile device communicate with each other over a Bluetooth network. The mobile device communicates with the external world directly over the cellular network. The camera in the headset captures a video stream and the microphone captures sound. The headset can optionally store the audio/video in the onboard storage or output the audio/video stream to the paired device over the Bluetooth network. The paired device, in turn, streams the audio/video to the external world directly over the cellular network.

FIG. 38 shows communication amongst the headset, its paired mobile device, an external computer, and the mobile devices. The headset pairs with the mobile device over a Bluetooth network, and the paired device connects to the cellular network. The camera in the headset captures a video stream and the microphone captures sound. The headset can optionally store the audio/video in the onboard storage or output the audio/video stream to the paired device over either Bluetooth network. The paired device, in turn, streams the audio/video to the external mobile devices and the live hub over the cellular network. The client computer communicates with the live hub over a direct Internet TCP/IP connection.

Figure 39:
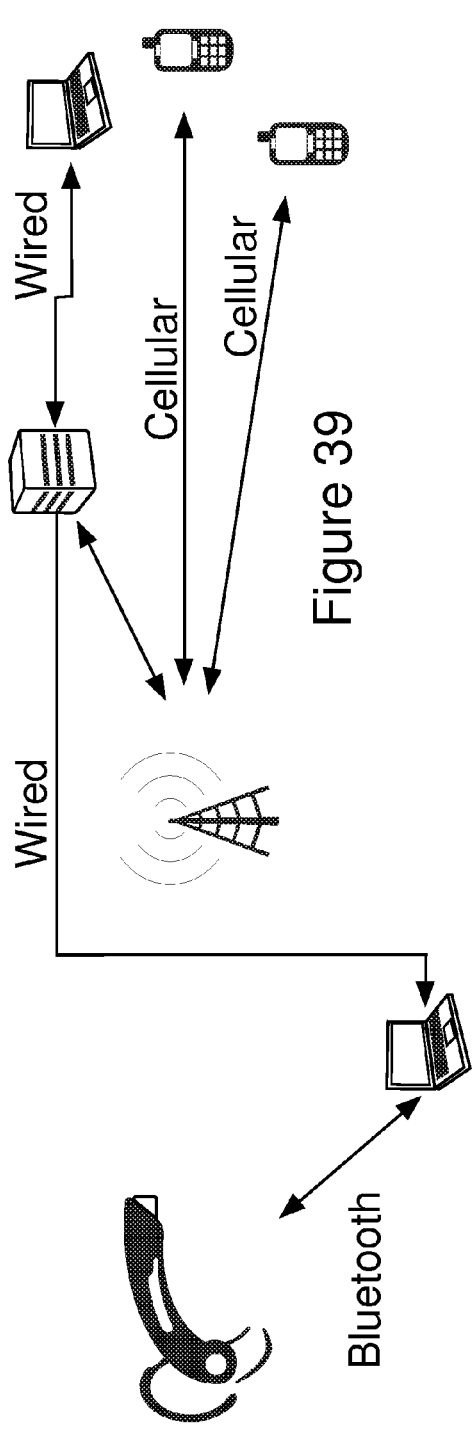
FIG. 39 is a schematic diagram showing communication amongst the headset with a paired device, the live hub, and external client devices, such as mobile phones and computers using cellular connections, as well as direct Internet connections, according to the invention.

FIG. 39 shows the communication paths across a headset that is paired with a computer, a live hub, external computers, and mobile devices. The camera in the headset captures a video stream and the microphone captures sound. The headset can optionally store the audio/video in the onboard storage or output the audio/video stream to the paired computer over a Bluetooth or Wi-Fi network. The paired computer is directly connected to the live hub over the Internet connection using TCP/IP. Similarly, communication between the client computer and the live hub is also through a direct Internet connection using TCP/IP. Communication between the mobile devices and the live hub is over the cellular network.

Figure 40:
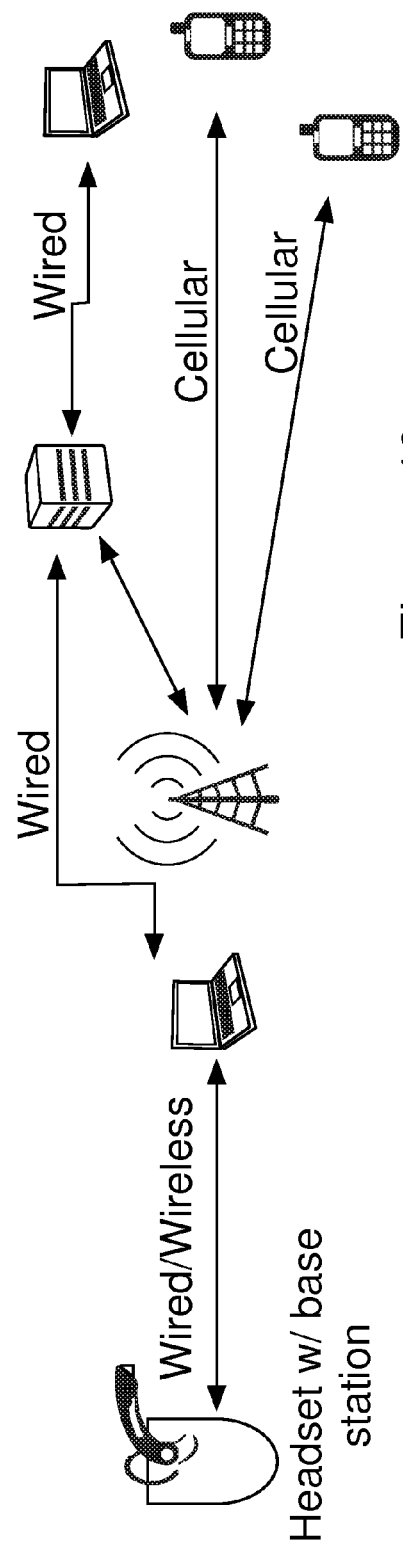
FIG. 40 is a schematic diagram showing communication between headset seated in the base station with wired connection to a computer and other external mobile devices, according to the invention.

FIG. 40 shows the headset seated in a docking station. The docking station is directly connected to a computer over a wired network. The computer is connected to the live hub via a direct Internet connection. The communication between the client computer and the live hub is also through a direct Internet connection using TCP/IP. The communication between mobile devices to the live hub is over the cellular network.

Figure 41:
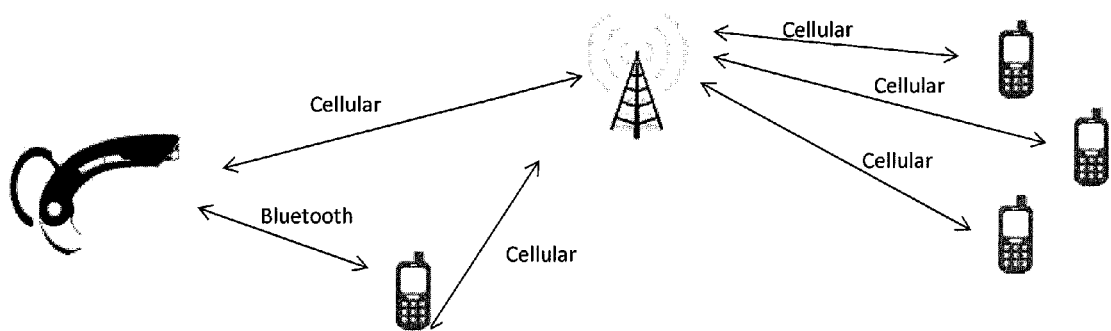
FIG. 41 is a schematic diagram showing communication amongst the headset with a paired mobile device over Bluetooth and external client devices, such as mobile phones and computers, using cellular connections, as well as direct Internet connections, according to the invention.

FIG. 41 depicts the communication between headset paired with a mobile device and external mobile devices via a cellular network. The headset and the paired mobile device connect to the cellular network directly and independently of each other. The headset pairs with the mobile device over either a cellular or a Bluetooth network. The camera in the headset captures a video stream and the microphone captures sound. The headset can optionally store the audio/video in the onboard storage or output the audio/video stream to the paired device over the cellular or Bluetooth network. The paired device, in turn, streams the audio/video to the external world directly over the cellular network.

Figure 42:
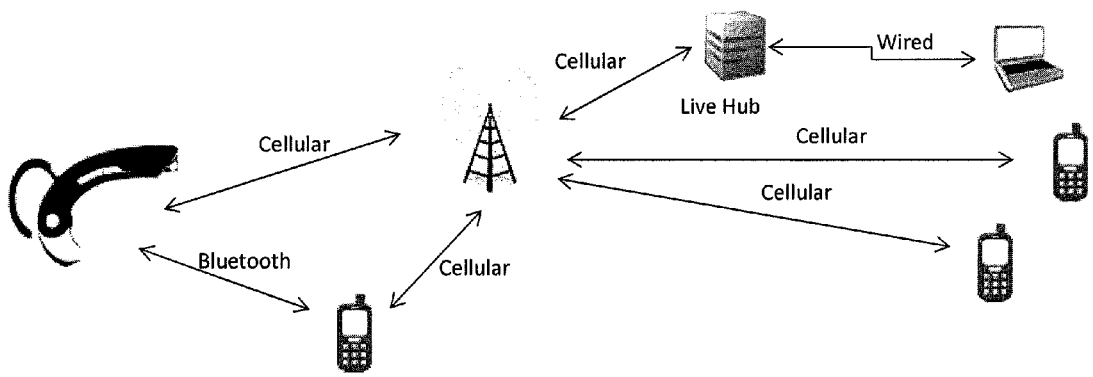
FIG. 42 is a schematic diagram showing communication amongst the headset with paired mobile device over a Bluetooth network, with independent networking for connection to devices and the live hub over a cellular network according to the invention.

FIG. 42 shows communication amongst a headset that is paired with a mobile device and external mobile devices and a client computer. The headset pairs with the mobile device over the Bluetooth network. The paired device connects to the external world over a cellular network. The camera in the headset captures video stream and the microphone captures the sound. The headset can optionally store the audio/video in the onboard storage or output the audio/video stream to the paired device over Bluetooth network. The paired device, in turn, streams the audio/video to the external mobile devices and the live hub over the cellular network. The client computer communicates with the live hub over a direct Internet TCP/IP connection.

Figure 43:
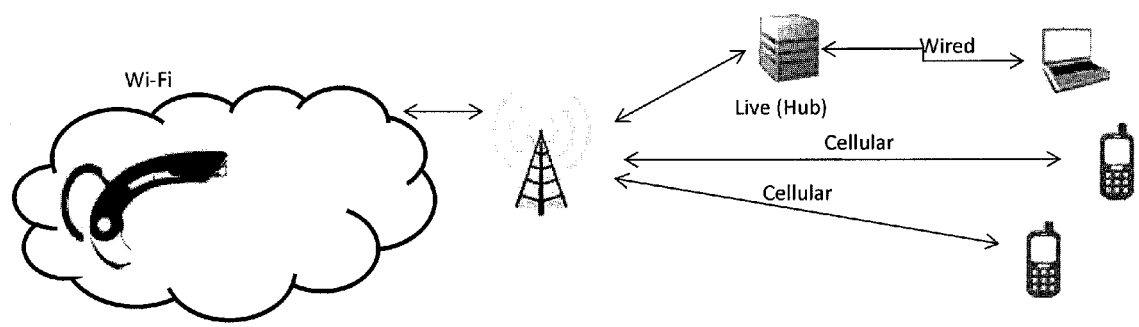
FIG. 43 is a schematic diagram showing communication between the headset inside a Wi-Fi network and the external client devices, such as mobile phones and computers, using cellular connections, as well as direct Internet connections, according to the invention.

FIG. 43 shows communication amongst the headset, the live hub, an external computer, and the external mobile devices via a combination of cellular, Wi-Fi, and TCP/IP networks. The headset does not have a paired device. The camera in the headset captures a video stream and the microphone captures sound. The headset can optionally store the audio/video in the onboard storage or output the audio/video stream to the external world directly over the cellular network or over the combination of Wi-Fi and cellular networks. The client computer makes a direct Internet TCP/IP connection with the live hub.

Figure 44:
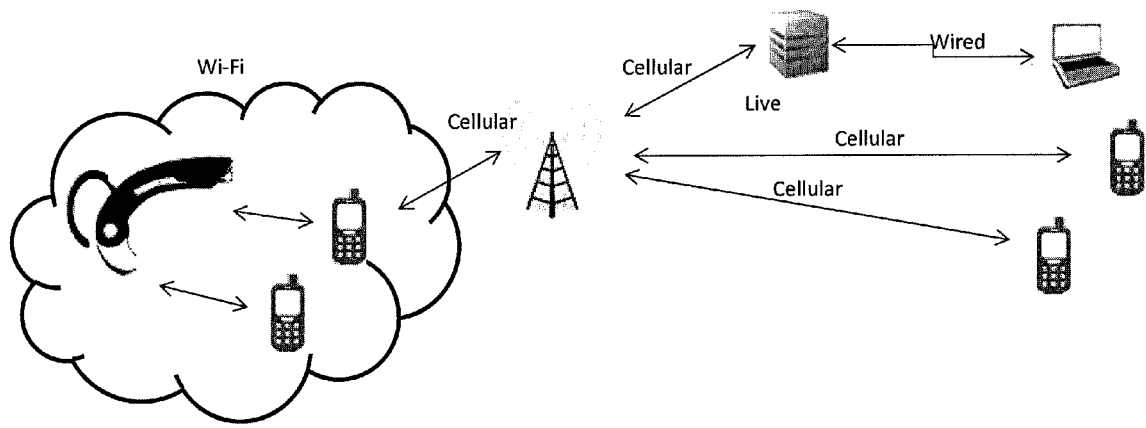
FIG. 44 is a schematic diagram showing communication amongst the headset with paired mobile devices over a Bluetooth network within a Wi-Fi network, where the Wi-Fi network devices communicate with the external devices and the live hub over the cellular network according to the invention.

FIG. 44 illustrates communication between a headset that is paired with mobile devices within Wi-Fi network and the external world. The camera in the headset captures a video stream and the microphone captures sound. The headset can optionally store the audio/video in the onboard storage or output the audio/video stream to the paired devices over a Bluetooth or Wi-Fi network. The paired devices, in turn, transmit the audio/video stream to the external world through the Wi-Fi network and then onto the cellular network or directly via the cellular network. The client computer makes a direct Internet TCP/IP connection with the live hub.

FIG. 45 illustrates communication between a headset that is paired with mobile devices within a Wi-Fi network and the external world. The camera in the headset captures a video stream and the microphone captures sound. The headset can optionally store the audio/video in the onboard storage or output the audio/video stream to the paired devices over the Bluetooth network. The paired devices, in turn, transmit the audio/video stream to the external world through the Wi-Fi network and then onto the cellular network or directly via the cellular network. The client computer makes a direct Internet TCP/IP connection with the live hub.

FIG. 46 shows the headset, a computer, and other devices in a Wi-Fi network. The communication is between a headset that is paired with a game controller and a television monitor. The headset is Bluetooth connected to a computer that connects to a live hub directly over the Internet network. The communication between the live hub and the client devices is over a cellular network and a direct Internet TCP/IP network.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

The invention claimed is:

1. A modular communications apparatus, comprising:
an earpiece module comprising a microphone, an earphone, an antenna, a microprocessor, an expandable memory storage, a high-speed data port, an internal battery, and a removable and rechargeable external earpiece battery; and
a camera phone module comprising a microprocessor, an expandable memory storage, a high-speed data port, and an internal battery;
said earpiece module and said camera phone module each comprising a complementary connector with which the camera phone module and the earpiece module are each electrically and mechanically engaged;
wherein when said earpiece module and said camera phone module are disengaged, each said module exhibits independent functionality and when each module is paired wirelessly or engaged both modules operate interdependently as a unified apparatus;
wherein when the camera phone module and the earpiece module are disengaged:
the earpiece module is independently operable as any of a standalone media player and a wireless communications device for communication with the detached camera phone module and other wireless devices over a network; and
the detachable camera phone module is independently operable as a hand-held, GPS enabled, wide, local, and personal area network phone; and
wherein when the camera phone module and the earpiece module are engaged:
the attached camera phone and earpiece operate as a unified point-of-view (POV) video camera and telecommunications headset having a form factor that is wearable by a user hands-free with the earphone positioned in the user's ear; and
the weight of the attached camera phone module extends in front of the user's ear and is counter-balanced by the weight of said removable and rechargeable external earpiece battery that is attached to the earpiece module behind the user's ear.

2. The modular communications apparatus of claim 1, further comprising:
a flip out display on the attached camera phone module which, when said camera phone module is worn as a headset, is extendable to be worn over the user's eye as a monocular viewfinder display.

3. The modular communications apparatus of claim 2, wherein when the flip out display is extended in front of the user's eye as a monocular viewfinder display, a second camera above the flip out display operates as an eye and facial motion sensor.

4. The modular communications apparatus of claim 1, further comprising:
a second earpiece module that when paired wirelessly or engaged with said earpiece module operate as a unified hands-free media player and set of stereo headphones.

5. The modular communications apparatus of claim 4, further comprising at least one of:
a second camera phone module that is paired wirelessly or engaged with said second earpiece module and said camera phone module and worn as a headset on the user's other ear;
an adjustable neckpiece battery module for interconnecting said earpiece module, said second earpiece module, said camera phone module and said second camera phone module for at least one of:
stereo sound;
expanded networking;
media functionality;
memory;
power; and
operation as a unified dual camera;
operation as binocular display telecommunications headset.

6. The modular communications apparatus of claim 1, further comprising at least one of
a multimedia heads-up display glasses module operable as a single unified binocular display telecommunications headset when paired wirelessly or engaged with in combination the earpiece module and the camera phone module; and
a modular device, data, and network management system and gateway for establishing a communications network with each module.

7. The modular communications apparatus of claim 6, wherein said modular device, data, and network management system and gateway is adapted to perform at least one of:
configuring each individual module for engagement and disengagement, or for wireless pairing, and autonomous or unified operation; and
expanding to engage/disengage one or more modules in any of a synchronized, ad-hoc or coordinated, hierarchical, or managed network organizational model to effect a standard modular device and data management system.

8. The modular communications apparatus of claim 1, wherein the camera phone module further comprises:
a module housing physically containing any of:
a GPS enabled wide, local, and personal area network telephone, including a camera, microphone, and speaker;
a laser range finder and light, motion and orientation sensors;
an optical zoom and autofocusing system;

a retractable and extendable tilting viewfinder screen; and an Infrared night vision camera.

9. The modular communications apparatus of claim 8, further comprising within the camera phone housing module at least one of:

a module for automatically zooming and focusing on people and objects in the camera's field of view by using the laser range finder and IR light and motion sensor to identify the distance to objects in the camera's field of view, and for automatically selecting an optimum optical zoom and focal distance to one or more objects;

a module for detecting eye and facial movement to identify objects of interest and interpretation of the eye and facial movement for hands-free control of the camera and automation of camera optical zoom and auto focusing system;

a module for capturing voice input and interpreting the voice input as any of a voice command, voice activation, and speaker authentication; and a module for detecting motion and orientation as an event for triggering action of one or more devices contained within the camera phone housing module.

10. The modular communications apparatus of claim 1, further comprising:

a processor performing power management tasks of a power management subsystem that optimize use of power, including automatically determining, based on power availability, at least one of:

which communication protocol to use;

whether to use a camera light or not; and which recording options to use.

11. The modular communications apparatus of claim 1, said earpiece module further comprising at least one of:

a slot for plugging in a removable storage device;

a power and data port for an external removable battery module or neckpiece battery;

a high speed power and data port for connecting the earpiece module with the camera phone module; and at least one button for controlling playing of media.

12. The modular communications apparatus of claim 11, wherein when the camera phone module is engaged with the earpiece module, the modular communications apparatus is enabled to perform at least one of the following:

a microphone contained within a camera phone module is selectively disabled or used in coordination with a corresponding earpiece module microphone for selective noise cancelation or selective voice recognition and audio recording, wherein the earpiece module is operable to provide voice input commands to each of the earpiece module and camera phone module;

a speaker contained within a camera phone module is selectively disabled, and a corresponding headphone speaker contained within the earpiece module is operable to provide output from the camera phone module; and the camera phone module is operable to store media or data to, or retrieve media or data from, the removable storage device contained within the earpiece module.

13. The modular communications apparatus of claim 1, further comprising:

a docking station configured to receive a plurality of modules and further configured to provide external power accessory battery charging, a host connection, and peripheral expansion to said modules.

14. The modular communications apparatus of claim 1, further comprising:

a pair of sunglasses having integrated therein:

an eyeglass frame holding two lenses comprising displays that provide a binocular see-through media display;

the eyeglass frame comprising right and left arm supports, each arm comprising an optical and digital zoom camera and supporting an earpiece headphone;

the eyeglass frame further comprising an eye motion scanner; and a module for providing devices attached to the eyeglass frame access to a wireless network.

15. The modular communications apparatus of claim 14, wherein the modular communications apparatus is further configured for at least one of:

monitoring any of eye and facial movements with the eye motion scanner, and controlling a zoom and hands-free camera with the eye and facial movement information received over the wireless network;

wherein the two lenses comprise left and right lenses further configured for day and near infrared binocular visual display of captured video content from a video camera;

wherein the wireless network is operable to transfer multimedia data to and from a device that is not attached to said modular communications apparatus; and wherein the wireless network is operable to transfer audio data between said apparatus and a mobile telephone that is not attached to said modular communications apparatus.

* * * * *